United States Patent [19]
Rude

[11] Patent Number: 6,049,720
[45] Date of Patent: Apr. 11, 2000

[54] LINK DELAY CALCULATION AND COMPENSATION SYSTEM

[75] Inventor: Michael J. Rude, Minnetonka, Minn.

[73] Assignee: Transcrypt International / E.F. Johnson Company, Burnsville, Minn.

[21] Appl. No.: 08/838,853

[22] Filed: Apr. 11, 1997

Related U.S. Application Data

[60] Provisional application No. 60/015,311, Apr. 12, 1996, and provisional application No. 60/027,763, Oct. 7, 1996.

[51] Int. Cl.$^7$ .................................................. H04B 7/00
[52] U.S. Cl. ............................................ 455/503; 455/67.6
[58] Field of Search .................................. 455/502, 503, 455/12.1, 11.1, 13.2, 13.1, 67.1, 67.3, 67.6; 375/355, 356

[56] References Cited

U.S. PATENT DOCUMENTS

| | | | |
|---|---|---|---|
| Re. 34,036 | 8/1992 | McGeehan et al. | 455/71 |
| 3,867,700 | 2/1975 | Wycoff | 325/50 |
| 4,085,368 | 4/1978 | Yeh | 325/304 |
| 4,125,744 | 11/1978 | Goodall | 179/1.5 R |
| 4,131,849 | 12/1978 | Freeburg et al. | 325/54 |
| 4,131,850 | 12/1978 | Wilcox | 325/137 |
| 4,255,620 | 3/1981 | Harris et al. | 179/15.55 |
| 4,281,413 | 7/1981 | Forrest | 455/34 |
| 4,325,057 | 4/1982 | Bishop | 340/539 |
| 4,406,016 | 9/1983 | Abrams et al. | 455/19 |
| 4,490,830 | 12/1984 | Kai et al. | 375/40 |
| 4,516,269 | 5/1985 | Krinock | 455/51 |
| 4,607,257 | 8/1986 | Noguochi | 455/13.2 |
| 4,679,243 | 7/1987 | McGeehan et al. | 455/47 |
| 4,696,051 | 9/1987 | Breeden | 455/33 |
| 4,696,052 | 9/1987 | Breeden | 455/51 |
| 4,701,934 | 10/1987 | Jasper | 342/418 |
| 4,726,069 | 2/1988 | Stevenson | 455/46 |
| 4,802,191 | 1/1989 | McGeehan et al. | 375/43 |
| 4,803,739 | 2/1989 | Kaikoku et al. | 455/47 |
| 4,852,090 | 7/1989 | Borth | 370/104 |
| 4,862,098 | 8/1989 | Yassa et al. | 329/50 |
| 4,972,410 | 11/1990 | Cohen et al. | 370/100.1 |
| 4,994,804 | 2/1991 | Sakaguchi | 341/143 |
| 5,003,617 | 3/1991 | Epsom et al. | 455/51 |
| 5,038,403 | 8/1991 | Leitch | 455/51 |
| 5,060,240 | 10/1991 | Erickson et al. | 375/38 |
| 5,061,934 | 10/1991 | Brown et al. | 342/162 |
| 5,077,759 | 12/1991 | Nakahara | 375/107 |
| 5,105,439 | 4/1992 | Bennett et al. | 375/10 |
| 5,113,413 | 5/1992 | Brown et al. | 375/40 |
| 5,117,424 | 5/1992 | Cohen et al. | 370/105.5 |
| 5,117,503 | 5/1992 | Olson | 455/51.1 |
| 5,127,101 | 6/1992 | Rose, Jr. et al. | 455/51.1 |
| 5,128,934 | 7/1992 | Jasinski | 370/84 |
| 5,131,007 | 7/1992 | Brown et al. | 375/40 |
| 5,131,010 | 7/1992 | Derrenge et al. | 375/100 |
| 5,134,630 | 7/1992 | Bateman | 375/1 |

(List continued on next page.)

FOREIGN PATENT DOCUMENTS

| | | |
|---|---|---|
| 0004702 | 10/1979 | European Pat. Off. . |
| 0020893 | 1/1981 | European Pat. Off. . |
| 0515214 | 11/1992 | European Pat. Off. . |
| 0551126 | 7/1993 | European Pat. Off. . |
| 323678 | 8/1983 | Germany . |

(List continued on next page.)

OTHER PUBLICATIONS

Hattori, T., et al., "Theoretical Studies of a Simulcast Digital Radio Paging System Using a Carrier Frequency Offset Strategy", *IEEE Transactions on Vehicular Technology*, vol. VT–29, No. 1, pp. 87–95, (Feb. 1980).

(List continued on next page.)

*Primary Examiner*—Thanh Cong Le
*Attorney, Agent, or Firm*—Schwegman, Lundberg, Woessner & Kluth P.A.

[57] ABSTRACT

The present link delay calculation system using a common reference signal and a pulsed or gated tone signal to determine the link delay. The system using a discrete-time Fourier transform to measure phase information and obtain the link delay time. One such system employing a global positioning satellite signal to synchronize signal generation at a control site and demodulation at a remote site.

13 Claims, 23 Drawing Sheets

U.S. PATENT DOCUMENTS

| | | | |
|---|---|---|---|
| 5,142,692 | 8/1992 | Owen | 455/48 |
| 5,155,859 | 10/1992 | Harris et al. | 455/51.2 |
| 5,172,396 | 12/1992 | Rose, Jr. et al. | 375/107 |
| 5,184,242 | 2/1993 | Yamashita | 359/177 |
| 5,194,871 | 3/1993 | Counselman, III | 342/357 |
| 5,201,061 | 4/1993 | Goldberg et al. | 455/51.2 |
| 5,212,807 | 5/1993 | Chan | 455/33.4 |
| 5,218,621 | 6/1993 | Cudak et al. | 375/11 |
| 5,218,717 | 6/1993 | Reitberger | 455/51.2 |
| 5,227,741 | 7/1993 | Marchetto et al. | 332/100 |
| 5,239,672 | 8/1993 | Kurby et al. | 455/16 |
| 5,243,299 | 9/1993 | Marchetto et al. | 329/300 |
| 5,257,404 | 10/1993 | Goreham et al. | 455/51.2 |
| 5,261,118 | 11/1993 | Vanderspool, II et al. | 455/51.2 |
| 5,280,629 | 1/1994 | Lo Galbo et al. | 455/51.2 |
| 5,287,550 | 2/1994 | Fennell et al. | 455/51.2 |
| 5,295,178 | 3/1994 | Nickel et al. | 379/58 |
| 5,319,374 | 6/1994 | Desai et al. | 342/387 |
| 5,327,144 | 7/1994 | Stilp et al. | 455/456 |
| 5,327,581 | 7/1994 | Goldberg | 455/51.2 |
| 5,353,307 | 10/1994 | Lester et al. | 375/14 |
| 5,353,342 | 10/1994 | Pietrowicz | 379/257 |
| 5,361,398 | 11/1994 | Christian et al. | 455/51.2 |
| 5,365,569 | 11/1994 | Witsaman et al. | 379/57 |
| 5,369,682 | 11/1994 | Witsaman et al. | 379/57 |
| 5,384,574 | 1/1995 | Counselman, III | 342/357 |
| 5,392,278 | 2/1995 | Teel et al. | 370/58.3 |
| 5,398,263 | 3/1995 | Vanderspool, II et al. | 375/376 |
| 5,406,842 | 4/1995 | Locke | 342/129 |
| 5,408,681 | 4/1995 | Ressler et al. | 455/17 |
| 5,414,734 | 5/1995 | Marchetto et al. | 375/267 |
| 5,416,808 | 5/1995 | Witsaman et al. | 375/350 |
| 5,423,056 | 6/1995 | Linquist et al. | 455/33.1 |
| 5,423,058 | 6/1995 | Cudak et al. | 455/51.2 |
| 5,423,059 | 6/1995 | Lo Galbo et al. | 455/51.2 |
| 5,448,570 | 9/1995 | Toda et al. | 370/95.3 |
| 5,448,758 | 9/1995 | Grube et al. | 455/51.2 |
| 5,465,405 | 11/1995 | Baseghi et al. | 455/226.4 |
| 5,473,638 | 12/1995 | Marchetto et al. | 375/356 |
| 5,477,539 | 12/1995 | Brown | 370/84 |
| 5,481,258 | 1/1996 | Fawcett et al. | 340/825.47 |
| 5,483,575 | 1/1996 | Zandowski et al. | 379/58 |
| 5,483,670 | 1/1996 | Childress et al. | 455/34.1 |
| 5,485,632 | 1/1996 | Ng et al. | 455/503 |
| 5,490,172 | 2/1996 | Komara | 375/296 |
| 5,513,215 | 4/1996 | Marchetto et al. | 375/233 |
| 5,542,119 | 7/1996 | Grube et al. | 455/503 |
| 5,555,546 | 9/1996 | Matsumoto | 315/244 |
| 5,590,403 | 12/1996 | Cameron et al. | 455/51.2 |
| 5,619,564 | 4/1997 | Canniff et al. | 379/386 |
| 5,668,836 | 9/1997 | Smith et al. | 375/316 |
| 5,697,051 | 12/1997 | Fawcett | 455/503 |
| 5,799,000 | 8/1998 | Hoole | 455/67.6 |
| 5,809,397 | 9/1998 | Harthcock et al. | 455/13.2 |

FOREIGN PATENT DOCUMENTS

| | | |
|---|---|---|
| 6508593 | 1/1967 | Netherlands . |
| 1574599 | 4/1977 | United Kingdom . |
| WO93/07681 | 4/1993 | WIPO . |
| WO93/11614 | 6/1993 | WIPO . |

OTHER PUBLICATIONS

Alisouskas, V.F., et al., *Digital and Data Communications*, pp. 88–89 & 119–126, (1985).

"Digital Signal Processing Applications Using the ADSP–2100 Family", vol. 1, Prentice Hall, Inc., edited by Amy Mar, 457–465 ,(1992).

Antoniou, A., "Digital Filters: Analysis and Design", McGraw–Hill, Inc., ed.: Frank Cerra, 214–215, (1979).

Hall, D., "DSPs ease task of detecting tones", *Personal Engineering*, 69–72, (Jan. 1996).

Haykin, S., "Communication Systems,", 2nd Edition, John Wiley & Sons, Inc., 141–146, 171–172, (1983).

Shanmugam, K.S., "Digital and Analog Communication Systems", John Wiley & Sons, Inc., pp. 268–272, 321–322, (1979).

Weaver, Jr., D.K., "A Third Method of Generation and Detection of Single–Sideband Singnals", Proceedings of the IRE, 1703–1705, (Dec. 1956).

LINK DELAY CALCULATION AND COMPENSATION SYSTEM

RELATED APPLICATIONS

This application claims the benefit of U.S. Provisional Patent Application Ser. No. 60/015,311 filed Apr. 12, 1996 entitled "LINK DELAY CALCULATION SYSTEM USING ZERO CROSSING DETECTION" and U.S Provisional Patent Application Ser. No. 60/027,763 filed Oct. 7, 1996 entitled "LINK DELAY CALCULATION USING DISCRETE-TIME FOURIER TRANSFORM."

FIELD OF THE INVENTION

The present invention relates to a system for measuring and correcting temporal latencies in broadcast systems. More particularly, the present invention relates to a system for characterizing and correcting relative link delays using a discrete-time Fourier transform.

BACKGROUND OF THE INVENTION

Repeater based systems employ links from a central site to coordinate transmissions by the repeaters. The links introduce time delays which vary from system to system and even from link to link. Several applications exist where it is important to characterize link delay. In simulcast applications, the link delay is characterized so that it can be removed from the system. This provides synchronous transmissions which have substantially lower phase error and are more easily received in overlap zones.

There is a need in the art for a link delay calculation system. The link delay calculation system must provide extremely accurate measurements of link delay. The link delay system should also be robust so that errors in reception are averaged out to give a precise estimation of link delay.

SUMMARY OF THE INVENTION

The present system provides a link delay measurement system using a discrete-time Fourier transform. A pulsed tone signal is transmitted in a repeater system having a plurality of remote sites. The pulsed tone signal is aligned to an external timing reference. The signal is received by the remote sites, which are also aligned to the timing reference. The link delay is calculated using a discrete-time Fourier transform of the pulsed tone signal which is performed on samples aligned to a timing reference signal.

In one embodiment, a global positioning satellite (GPS) system is used to align the pulsed tone signal which is transmitted by the central site of the repeater system. The GPS signal is also used by the remote sites to receive the pulsed tones.

Compensation of a number of links is performed by introducing delays according to the link delays.

BRIEF DESCRIPTION OF THE DRAWING

Referring now to the drawings in which like reference numbers represent corresponding parts throughout.

DETAILED DESCRIPTION

In the following detailed description, references made to the accompanying drawings which form a part hereof and in which is shown by way of illustration specific embodiments in which the invention may be practiced. These embodiments are described in sufficient detail to enable those skilled in the art to practice and use the invention, and it is to be understood that other embodiments may be utilized and that electrical, logical, and structural changes may be made without departing from the spirit and scope of the present invention. The following description is, therefore, not to be taken in a limiting sense and the scope of the present invention is defined by the appended claims and equivalents thereof.

Applicants hereby incorporate by reference the copending patent applications all filed on Apr. 12, 1996, entitled: TRANSMIT CONTROL SYSTEM USING IN-BAND TONE SIGNALING, Ser. No. 08/631.866 BANDWIDTH MANAGEMENT SYSTEM FOR A REMOTE REPEATER NETWORK, Ser. No. 08/628981, and SIMULTANEOUS BROADCAST MANAGEMENT SYSTEM, Ser. No. 08/630,673.

Applicants note the inclusion of Appendices A and B as attached and described below.

Figure 1:
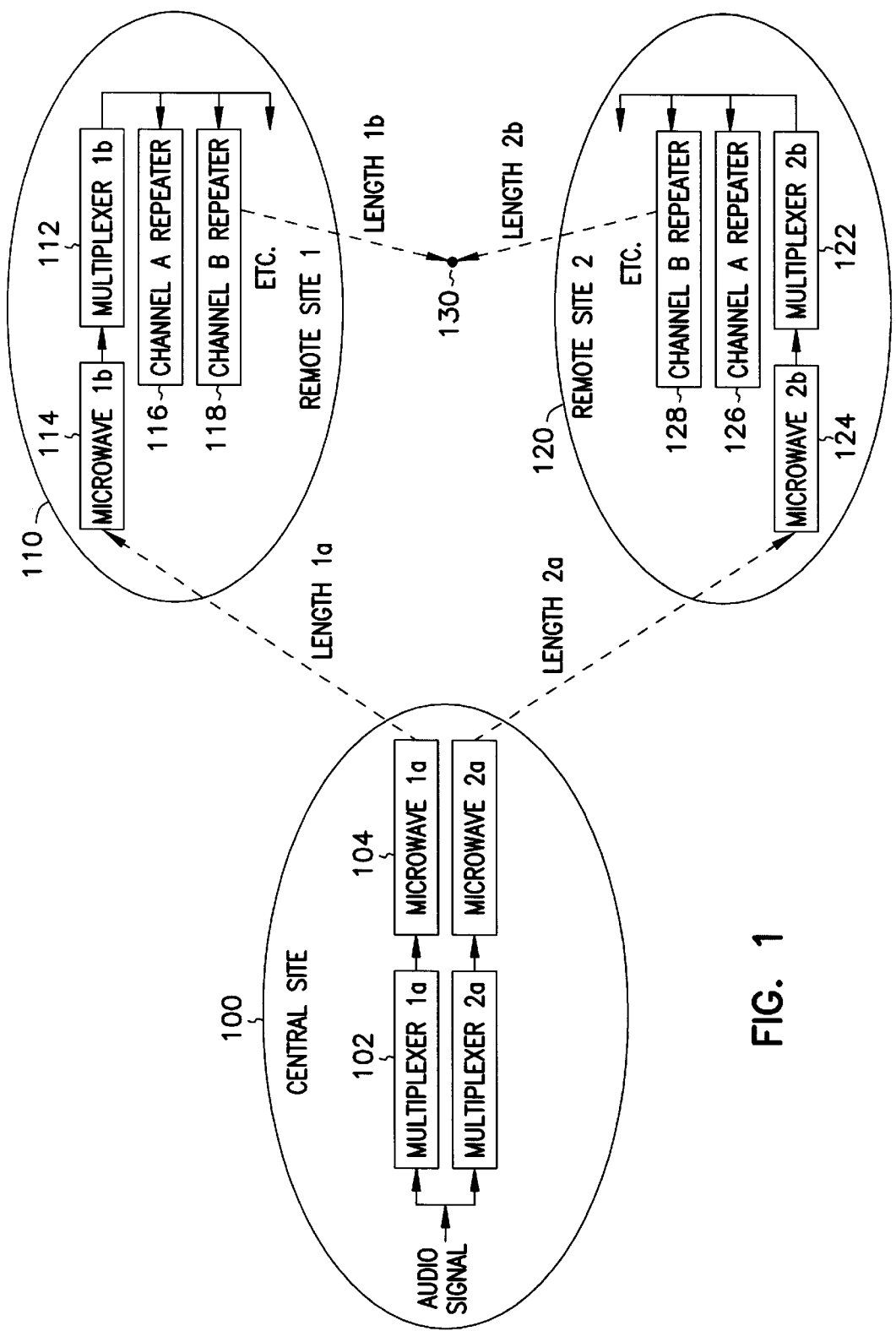
FIG. 1 is a block diagram showing one environment in which the present invention may be practiced.

FIG. 1 shows one environment in which the present invention may be practiced. In FIG. 1, two remote sites 110 and 120 contribute to the total signal received by receiver 130 in the overlap region. Notice that the audio signal at the central site 100 is split and passes to each remote site over a link consisting, at each end, of a multiplexer 112 and a microwave transceiver 114. Other links may be used without departing from the scope of the present invention. For example, instead of microwave links the system could employ optical fiber links. Furthermore, the system in FIG. 1 shows two channels, A and B, to demonstrate the present system. Other numbers of channels are possible without departing from the scope of the present invention.

For a given channel there are two paths from the audio signal at the central site to the location in the overlap region where we want to receive the two signals in phase. The delays of these paths are:

$$\text{delay}_{\text{path 1}} = \text{delay}_{\text{Multiplexer1a}} + \text{delay}_{\text{Microwave1a}} + \\ \text{length}_{1a} \times 5.37\ \mu\text{sec/mile} + \text{delay}_{\text{Microwave1b}} + \\ \text{delay}_{\text{Multiplexer1b}} + \text{delay}_{\text{Site 1}} + \text{length}_{1b} \times 5.37\ \mu\text{sec/mile} \quad \text{Eqn. 1}$$

and $$\text{delay}_{\text{path 2}} = \text{delay}_{\text{Multiplexer2a}} + \text{delay}_{\text{Microwave2a}} + \\ \text{length}_{2a} \times 5.37\ \mu\text{sec/mile} + \text{delay}_{\text{Microwave2b}} + \\ \text{delay}_{\text{Multiplexer2b}} + \text{delay}_{\text{Site 2}} + \text{length}_{2b} \times 5.37\ \mu\text{sec/mile} \quad \text{Eqn. 2}$$

It is necessary to introduce some additional delay to either $\text{delay}_{\text{Site 1}}$ or $\text{delay}_{\text{Site 2}}$ so that $\text{delay}_{\text{path 1}} = \text{delay}_{\text{path 2}}$. This condition corrects for phase delay between the paths and improves reception at the receiver.

In one embodiment, the additional delay is added to the site delay 110 or 120, however several other embodiments exist. For example, in alternate embodiments, the additional delay is introduced at the central site 100. Other delay sources are possible without departing from the present invention.

The present system is also applicable to the case where a transmitting site is located at the central site 100, except that in this case one of the signal paths does not contain any multiplexer or microwave equipment.

To temporally align the multiple transmitting sites, 110 and 120, one approach is to select one repeater of a particular channel as a reference transmitter and temporally align all of the other repeaters transmitting on a different channel to the reference transmitter. After all of the other repeaters transmitting on a different channel are temporally aligned, the remaining transmitters of the particular channel are aligned. This alignment is performed such that the simulcast situation is avoided throughout the alignment. The alignment is more reliable if simulcast is avoided, since there is no distortion due to the out-of-phase components at the receiver 130.

Figure 7:
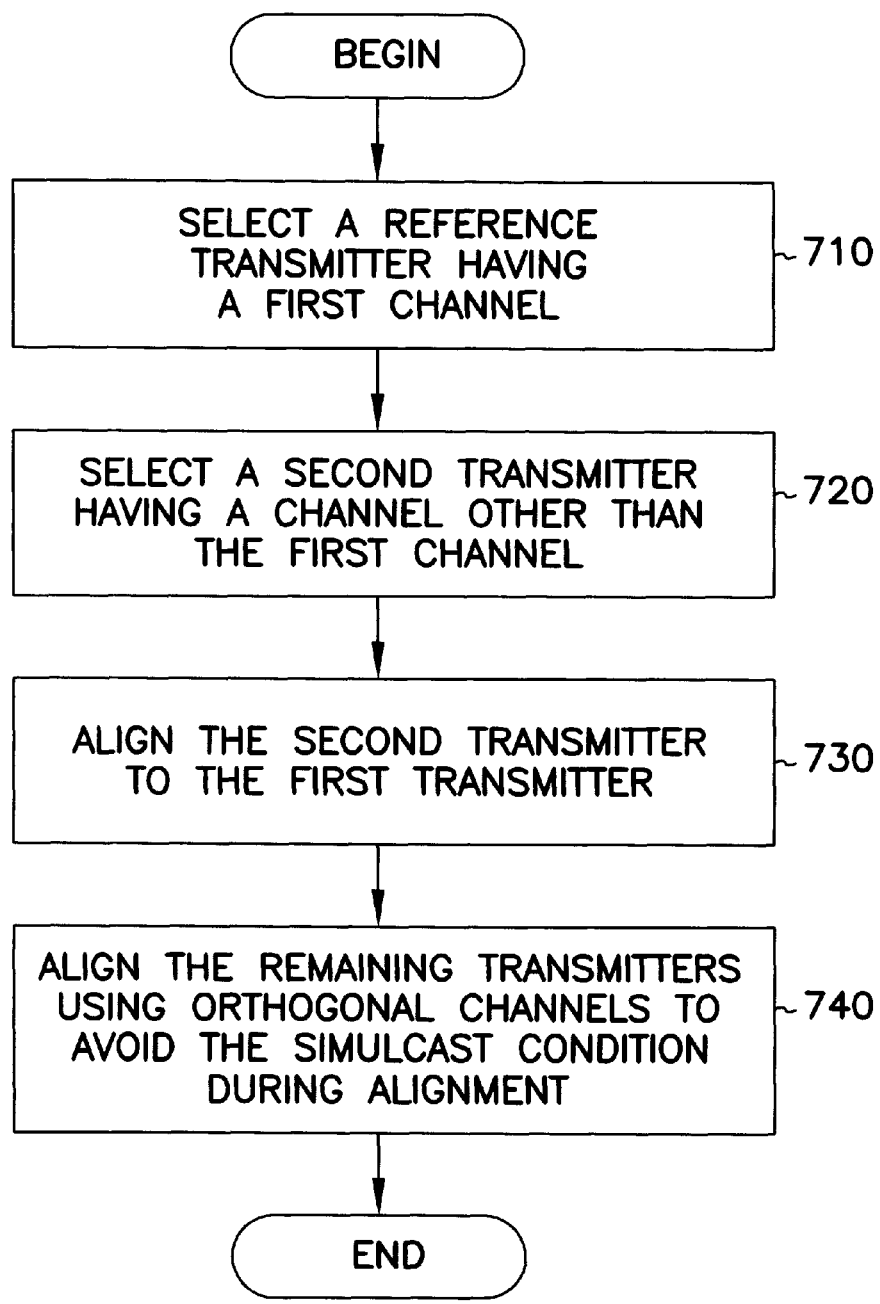
FIG. 7 is a flow diagram showing the alignment procedure according to one embodiment of the present invention.

FIG. 7 shows the operation of this embodiment. A reference transmitter is selected (710) and a second transmitter is selected which has a different channel (720). The second transmitter is aligned to the first transmitter (730). The remaining transmitters are aligned so that the simulcast condition is avoided (740). Alignment is accomplished by the method shown in FIGS. 8 and 9. Alignment is performed using a coarse adjustment (810) and a subsequent fine adjustment (820). Alignment is performed by demodulating a first transmitter channel (910) and a second transmitter channel (920), comparing the signals and implementing a delay in the leading transmitter to equalize the delay times (930). The delay implementation must be consistent so that the reference channel remains at a constant phase, so that all the other transmitters are aligned to it.

The reference transmitter receives an initial delay which exceeds the maximum possible delay difference between any two transmissions in the system. This maximum delay ensures that all of the remaining transmitters may be aligned to the reference by adding delay. Other methods may be incorporated without departing from the scope and spirit of the present invention. For example, one embodiment may provide a global reduction of the excess delay imposed on the transmitters after all transmitters are aligned. This would efficiently zero the smallest delay value of each transmitter to globally reduce the latency of the transmitter system. Other variations are possible without departing from the scope and spirit of the present invention.

For example, if channel A repeater 116 of remote site 1 110 is designated as a reference transmitter, then the channel B transmitters of the system are temporally aligned to channel A repeater 116. In this example, channel B repeater 118 and channel B repeater 128 are temporally aligned to the reference transmitter, repeater 116. Thereafter, the remaining channel A transmitters, besides the reference transmitter, are aligned to at least one of the aligned channel B transmitters. In this example, the channel A repeater 126 of remote site 2 120 is aligned either to (1) the channel B repeater 118 or (2) the channel B repeater 128 using the temporal alignment technique discussed herein. In either of these possible alignments, the simulcast condition is avoided, since like-channel alignments are avoided.

The selection of a reference transmitter serves to provide a "starting point" for the calibration of all transmitters in the system. As each transmitter is aligned, it too can serve as a reference for another transmitter of different channel. Therefore, the order of the alignment of the transmitters may be varied. For instance, in the above example, presuming that the channel A repeater 116 is used as an original reference, the following alignment permutations are possible:

Uncalibrated Transmitter X Aligned Relative To Calibrated Transmitter Y

Channel B repeater 118 aligned relative to Channel A repeater 116

Channel B repeater 128 aligned relative to Channel A repeater 116

Channel A repeater 126 aligned relative to Channel B repeater 118

Channel B repeater 118 aligned relative to Channel A repeater 116

Channel B repeater 128 aligned relative to Channel A repeater 116

Channel A repeater 126 aligned relative to Channel B repeater 128

Channel B repeater 128 aligned relative to Channel A repeater 116

Channel B repeater 118 aligned relative to Channel A repeater 116

Channel A repeater 126 aligned relative to Channel B repeater 118

Channel B repeater 128 aligned relative to Channel A repeater 116

Channel B repeater 118 aligned relative to Channel A repeater 116

Channel A repeater 126 aligned relative to Channel B repeater 128

Channel B repeater 118 aligned relative to Channel A repeater 116

Channel A repeater 126 aligned relative to Channel B repeater 118

Channel B repeater 128 aligned relative to Channel A repeater 116

Channel B repeater 128 aligned relative to Channel A repeater 116

Channel A repeater 126 aligned relative to Channel B repeater 128

Channel B repeater 118 aligned relative to Channel A repeater 116

Channel B repeater 118 aligned relative to Channel A repeater 116

Channel A repeater 126 aligned relative to Channel B repeater 118

Channel B repeater 128 aligned relative to Channel A repeater 126

Channel B repeater 128 aligned relative to Channel A repeater 116

Channel A repeater 126 aligned relative to Channel B repeater 128

Channel B repeater 118 aligned relative to Channel A repeater 126

Other combinations are possible and many-channel systems provide numerous other permutations for alignment.

Figure 3:
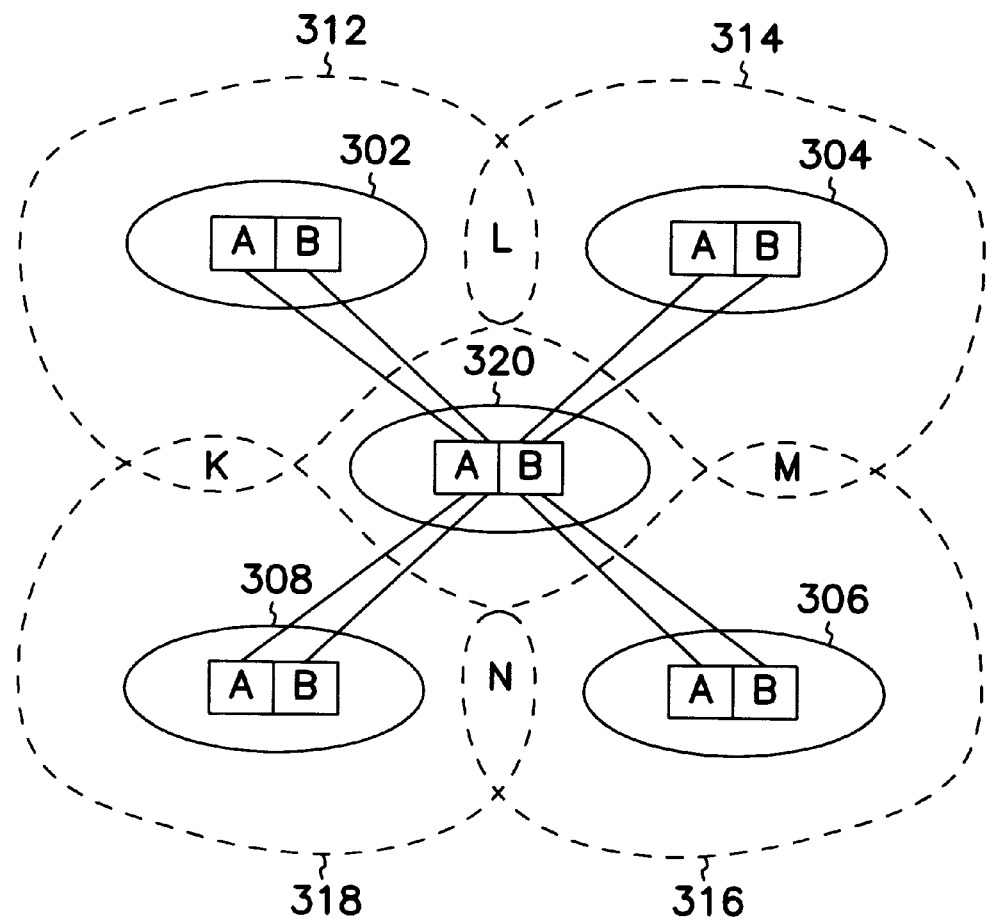
FIG. 3 is a diagram of one environment in which the present alignment system may operate.

Furthermore, the flexibility in transmitter alignment of the present invention facilitates alignment of different repeater topologies. For instance, the alignment method may be used to align the various transmitters found in FIG. 3. FIG. 3 shows four multichannel repeaters 302, 304, 306, and 308 having reception regions 312, 314, 316, and 318, respectively, and a central station 320. The present alignment system provides a consistent calibration for all transmitters in the system, since a first reference transmitter is used to align the remaining transmitters. The overlapping transmission areas, K, L, M, and N, present a number of alignment permutations, as demonstrated in the previous example. Other topologies may be aligned using the present method and the topologies discussed herein are for illustration of alternate embodiments of the present invention and are not intended in an exclusive or limiting sense. The order of which each transmitting source is aligned depends on whether an aligned transmitter of the opposite channel is present within the simulcast region of interest.

Figure 4:
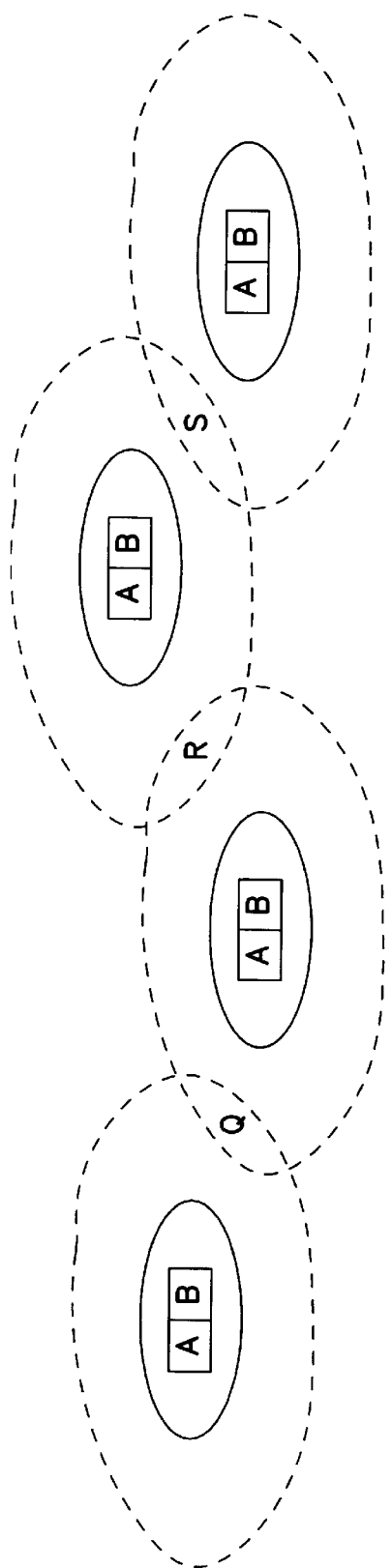
FIG. 4 is a diagram of one environment in which the present alignment system may operate.

FIG. 4 shows an alternate repeater topology having overlapping reception areas Q, R, and S. If one of the transmitters is used as a reference, the remaining transmitters may be aligned to the reference transmitter. Every transmitter in FIG. 4 may be aligned to the reference transmitter since there is an overlap region linking each of the repeaters.

This system for alignment may be extended to applications where more than two transmitting channels are present. For example, in one embodiment, a reference channel is selected and the "other-channel" transmitters are aligned. After these transmitters are aligned, the remaining transmitters are aligned, and the simulcast situation is avoided during alignment, as described above. As illustrated above, several alignment permutations are possible without departing from the scope and spirit of the present invention.

Figure 2:
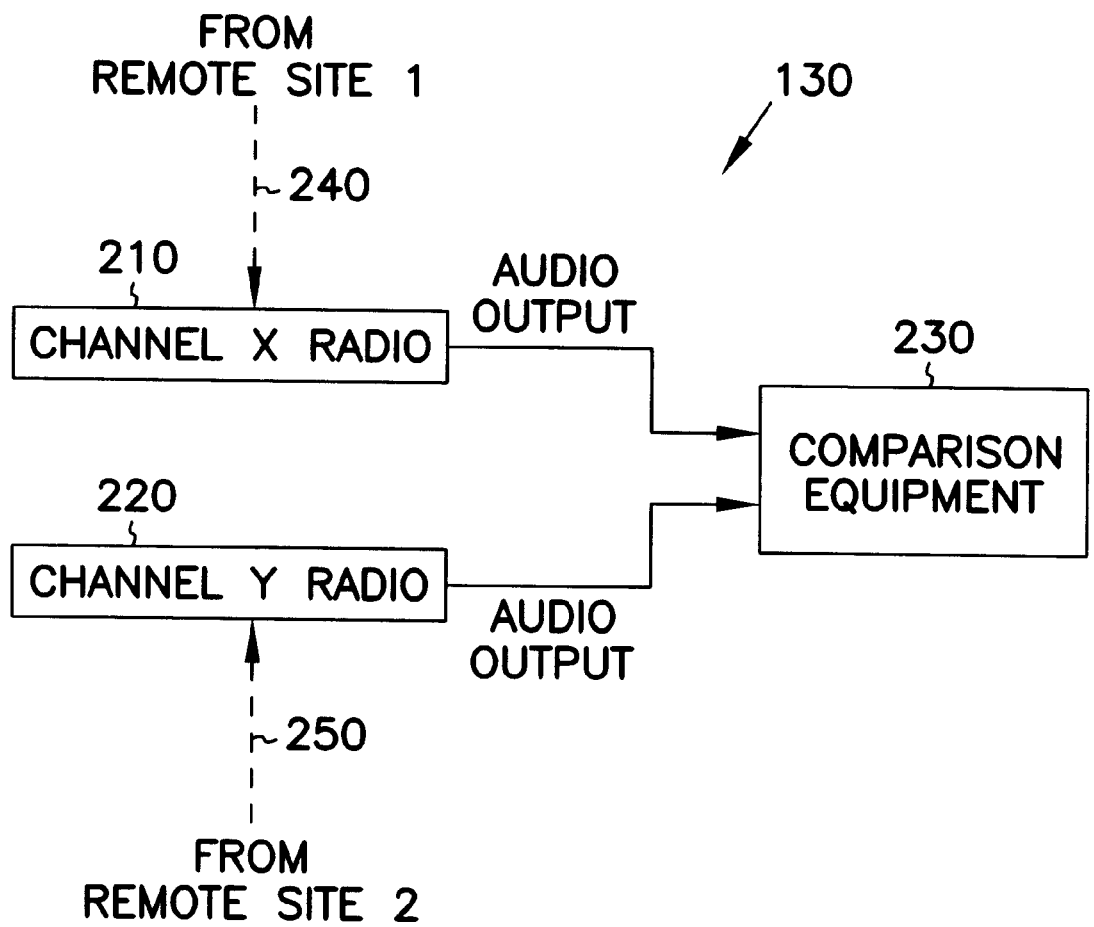
FIG. 2 is a block diagram of a receiver for measuring the relative phase difference between different transmissions.

The temporal alignment procedure is performed by having a special receiver 130 capable of receiving the different channels present in the overlap region, as shown in FIG. 2. Two radios, a channel X radio 210 and a channel Y radio 220, receive different channels and output a signal which is fed into comparison equipment 230 to measure the phase difference between signals received from the simulcast. FIG. 2 shows the signals 240 and 250 as received from different remote sites, however, it is contemplated within the present invention that the signals could originate from the same remote site for temporal alignment as described above. Additionally, FIG. 2 shows only two radios, however, this block diagram is illustrative and is not intended in an exclusive or limiting sense. In alternate embodiments, several channels may be received by several radios without departing from the scope of the present invention.

At the receiver 130, using the comparison equipment 230, audio outputs from each radio 210 and 250 are compared, giving the phase and time delay between the signals. The transmitters are selectively activated such that each radio receives transmissions from a single channel source per alignment. That is, there is no simulcast condition during the alignment process. In one embodiment, repeaters are disabled as needed to ensure that the simulcast of same-frequency signals is not received by the receiver 130.

Coarse and Fine Adjustment

Figure 8:
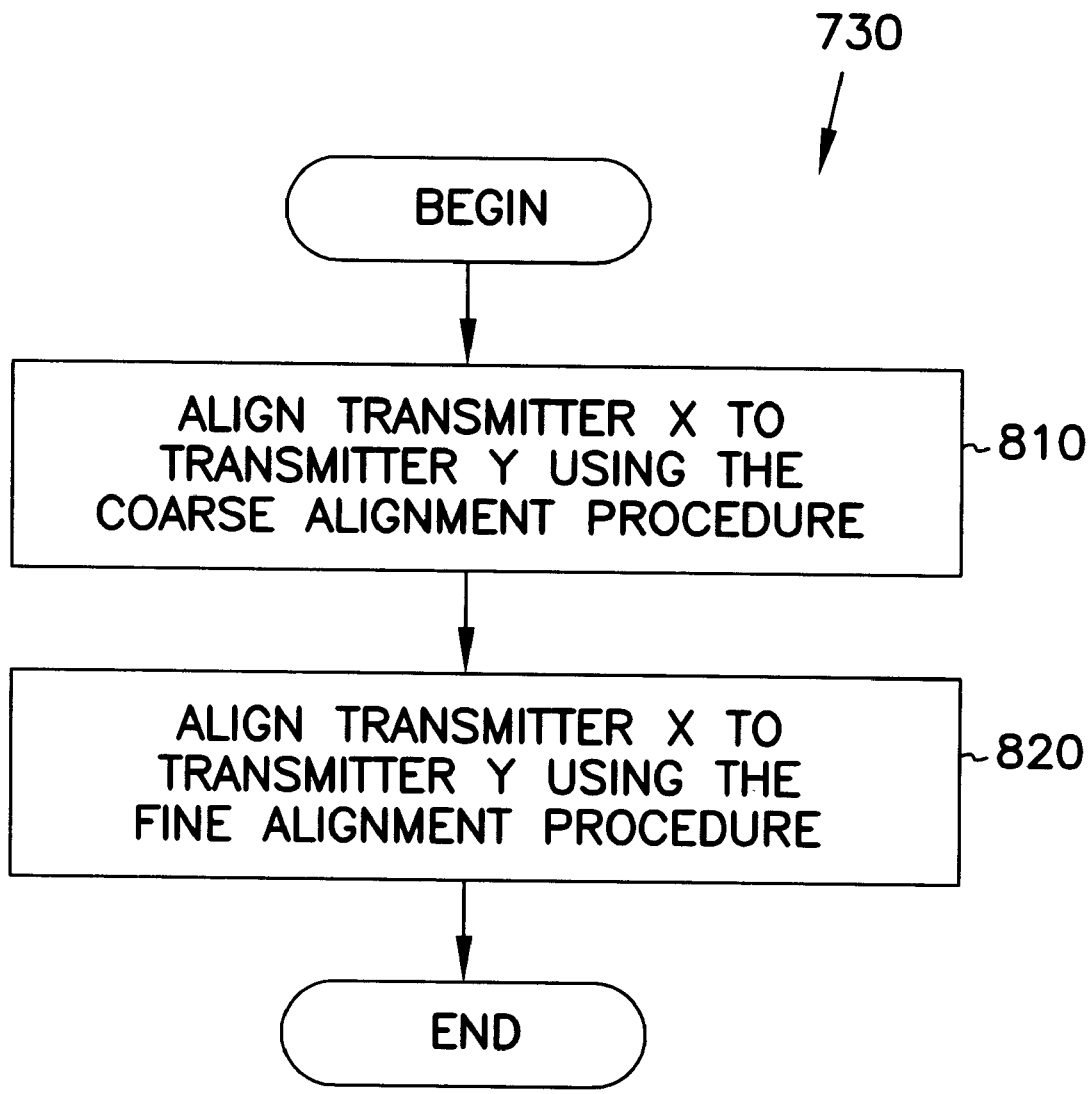
FIG. 8 is a flow diagram showing a coarse alignment and fine alignment according to one embodiment of the present invention.
Figure 9:
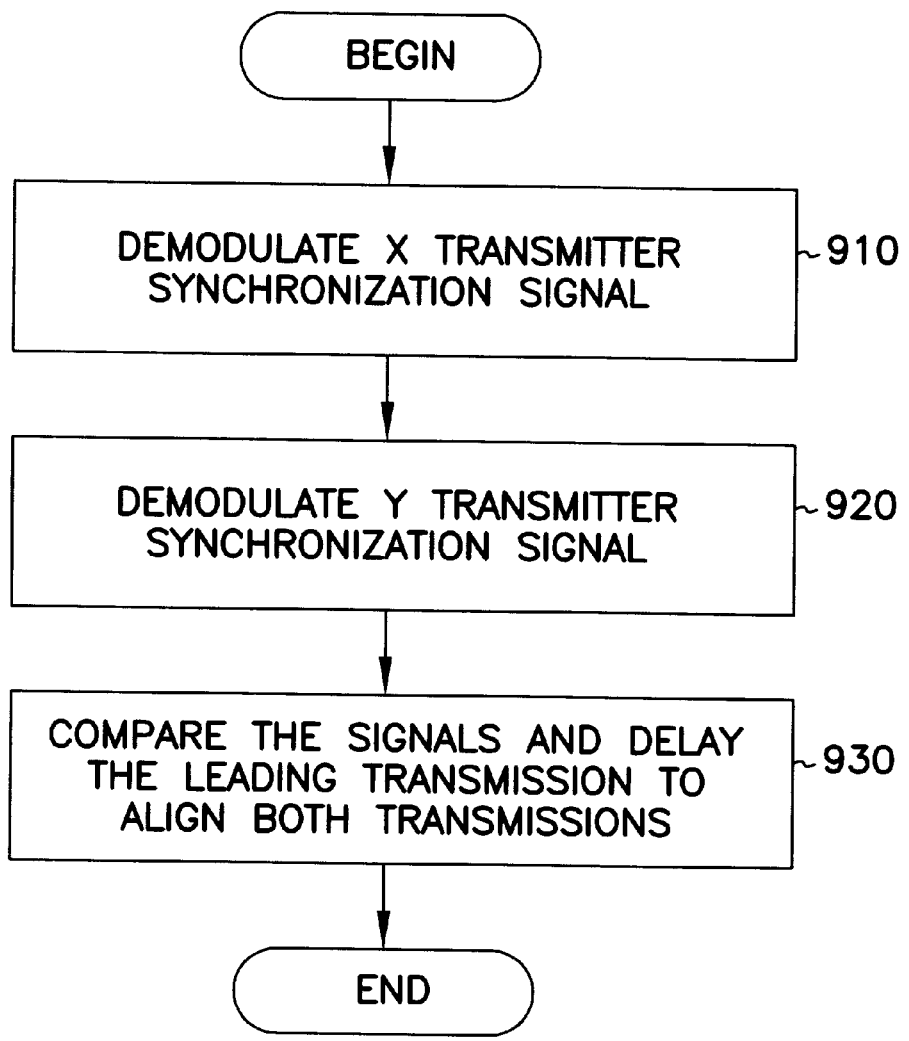
FIG. 9 is a flow diagram showing one example of signal comparison and transmitter alignment according to one embodiment of the present invention.

In one embodiment, the alignment is performed using a coarse adjustment and a fine adjustment, as shown in FIG. 8. For the coarse adjustment (810), a periodic signal may be used to establish a phase relationship between the different channels during temporal alignment. In one embodiment, a pulse-like signal is used as the audio signal at the central site 100. For example, a Hewlett-Packard 3314A Function Generator has a mode in which it produces a burst of approximately one and one-half cycles of a tone. These bursts must be separated in time by a period considerably longer than the total path delays. In this way each radio in the overlap region will produce a burst which can, for example, be displayed on an oscilloscope and can provide direct and quick measurement of the difference between the path delays.

Other methods for phase detection may be employed, and the use of an oscilloscope is not intended to be limiting or exclusive. For example, in one alternate embodiment, a computer having sound analysis software measures the time delay between tone bursts.

Additionally, other audio signals may be substituted, such as the use of a digital pulsetrain for performing the coarse adjustment. In one embodiment, the digital pulsetrain has a periodicity which is longer than the total path delay to facilitate identification of the path delay. In alternate embodiments, the latency measured between pulse rising or falling edges is recorded and used to temporally align the system. The appropriate delay is then implemented in the transmitter which is being aligned. In this way, one transmitter is brought into approximate temporal alignment with the reference transmitter.

In one embodiment, a pure tone is used as the central site audio signal for fine adjustment (820). The audio signals produced by the radios in the overlap will also be tones, with some small time delay between them which is determined by the accuracy of the coarse adjustment. One method of comparing the tones to determine the time delay between them is to use them as the inputs of an oscilloscope which is set on X–Y display.

Figure 5:
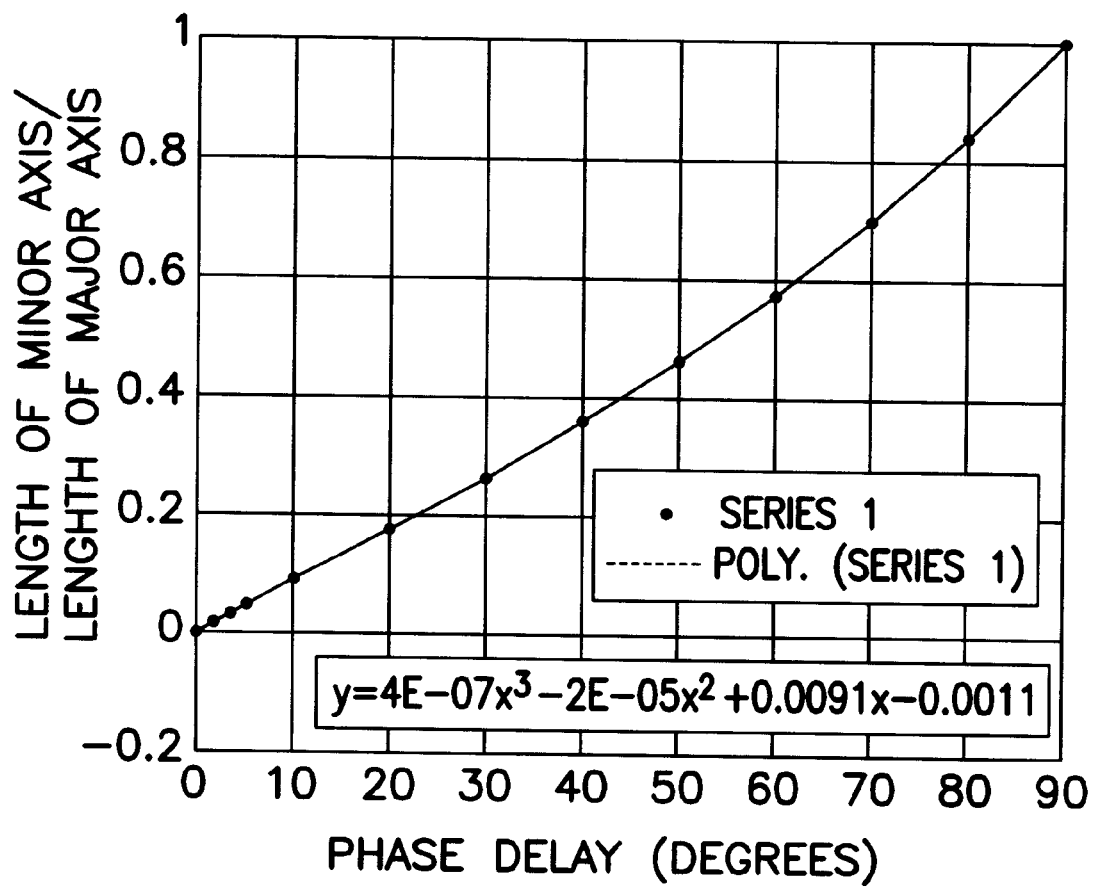
FIG. 5 is a plot of relative phase difference as a function of axis ratio according to one embodiment of the present invention.

If the two signals are in-phase (no time delay between them) then the display will show a line. In the most general case, however, the display will show an ellipse. The ratio:

$$r = \text{length of minor axis/length of major axis} \quad \text{Eqn. 3}$$

gives information about the time delay between the signals. The relationship between this ratio and the phase delay between the signals is shown in FIG. 5. The time delay is calculated using:

time delay (seconds)=(phase delay (degrees)/360)×(1/frequency of tone (Hz))

For example, if one measured r=0.132 then the polynomial fit in FIG. 5 indicates the phase delay is 15 degrees, which for a 1 KHz tone is 41.7 microseconds. The use of a 1 KHz tone is used to demonstrate the measurement of the time delay, and is not intended as an exclusive or limiting example. Other tone frequencies may be used without departing from the scope and spirit of the present invention.

Figure 6:
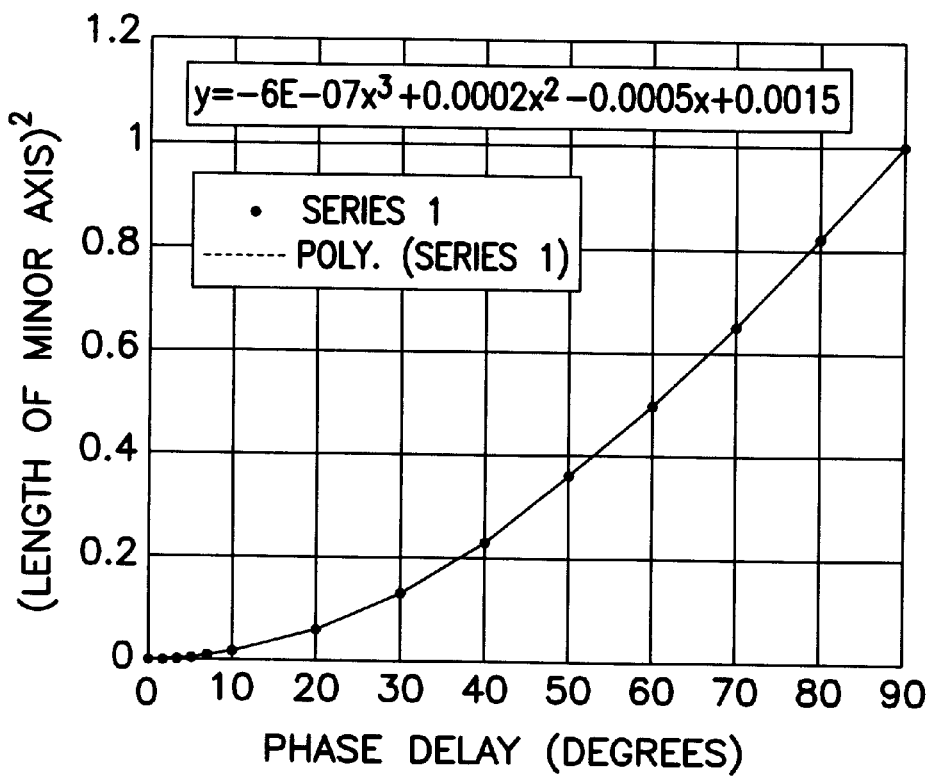
FIG. 6 is a plot of the relative phase difference as a function of the square of the length of the minor axis according to one embodiment of the present invention.

If other tone frequencies are used, the relationship shown in FIG. 5 remains the same. Additionally, other embodiments use different methods to determine the phase difference. For example, FIG. 6 shows how phase delay and the square of [length of minor axis] are related. Again, the appropriate delay is implemented in the channel which is being aligned.

The procedure is not limited to the two transmitter embodiment described above. In cases where an arbitrary number of transmitting sites occur, one channel (e.g., channel A), of one site (e.g., site 1), is designated as the reference. All other channels of all sites are timed to it. Next, channel A of all sites other than site 1 are timed to a channel of site I other than A. In this way all channels at all sites have been referenced, directly or indirectly, to channel A of site 1.

There is the potential that the radios used in the overlap region will themselves have somewhat different amplitude and/or time responses. In one embodiment, this problem is overcome by using an averaging technique. Temporal alignment is performed as stated above. Next, the radios are tuned to the opposite channel and the measurement is repeated. The average of these two delays is then implemented. This method compensates for the differences in delays for each radio.

In another embodiment, fine tuning is accomplished by a variable frequency generator which provides a tone whose frequency is swept across the audio spectrum instead of a single frequency tone, as discussed above. For example, for the fine adjustment, the tone frequency is swept from 300 Hz to 3000 Hz and the time delay information is recorded to map the time delay as a function of audio frequency. This method characterizes the time delay for various paths for different frequencies in the audio spectrum.

Furthermore, in an alternate embodiment, any periodic signal is used to provide the fine adjustment. For example, the periodic signal may be an audio tone or a digital pulsetrain. The periodic signal has a first periodic component which has a periodicity which is larger than the anticipated relative time delays for a coarse adjustment, and a second periodic component which provides relatively fine resolution for a fine adjustment. Therefore, in this embodiment, the fine tuning is achieved by measuring the relative delay of some characteristic portion of the periodic signals arriving simultaneously at the remote receiver, and calculating a time correction factor from the relative delay.

Throughout this description the term channel has been used to identify separate communications means for transferring information. Channels may be different frequencies, such as different AM, FM, or Single Sideband communications frequencies. However, the "channels" contemplated by this application are not limited to these examples and expressly include several other communications channels. For example, "channels" includes spread spectrum communications, digital communications, such as packetized communications, or any other communications mode whereby independent communications may take place, such as optical communications. Therefore, other channels are possible without departing from the scope of the present invention.

Implementation of Frequency Dependent Delay

It is possible that the link equipment may exhibit different delays at different audio frequencies. In this case if one equalized path delays at one particular audio frequency then the delay at other frequencies would not, in general, be precisely equalized. This would introduce distortion into the received signal. One method commonly used to alleviate frequency dependent delays is to introduce a compensating filter which has an inverse frequency dependent delay characteristic. These compensating filters are typically allpass filters, which can be implemented using discrete circuit elements or through Digital Signal Processing techniques.

Sound Analysis System

One embodiment of the present invention uses a software driven analysis program for audio analysis, such as *Spectra Plus version* 3.0 from Pioneer Hill Software, 24460 Mason Rd, Poulsbo, Wash. 98370.

This program combines a variety of instrument functions into one package. For example, one can look at the amplitudes of signals as a function of time, as with an oscilloscope. There are also operating modes for examining signal amplitude or phase versus frequency. Other capabilities include audio signal generator and distortion analysis modes. The software analysis program provides a compact and unified analysis means for monitoring the phase data.

Other sound analysis methods may be used without departing from the scope and spirit of the present invention.

Application of the Calibration Method

In one embodiment, the calibration is performed once upon the setup of the system, and then subsequently as needed. In alternate embodiments, the calibration is performed regularly to ensure system performance.

Directional Antenna Receiver System

Figure 10:
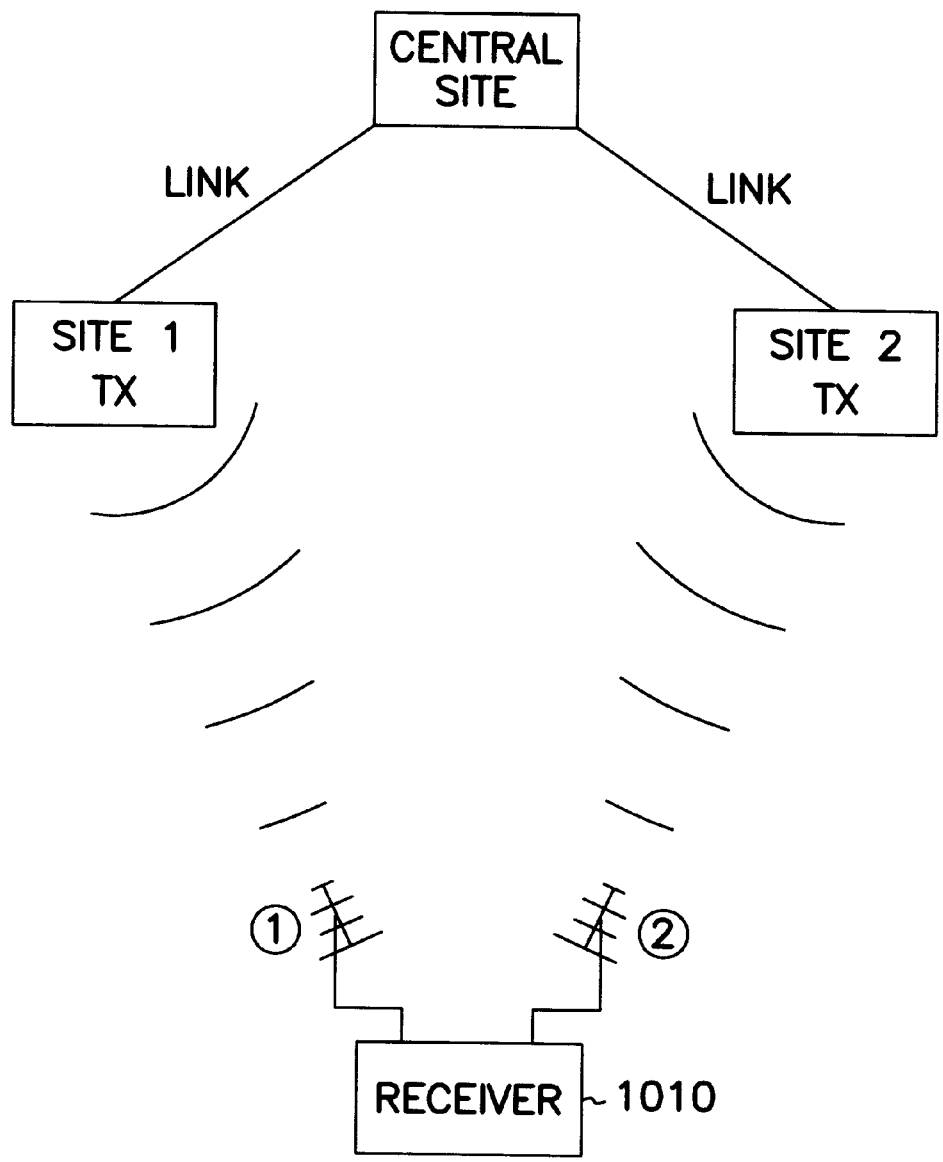
FIG. 10 is a diagram showing a directional antenna receiver system according to one embodiment of the present invention.

Another embodiment of the present invention provides for same-channel calibration using two or more directional antennas. FIG. 10 shows a system having a receiver 1010 which has dual directional antennas. The first antenna has an anisotropic reception pattern which is directed toward the transmitter at site 1. The second antenna is pointed to receive signals from the transmitter at site 2. This system provides alignment of the two transmitters at site 1 and site 2 using the phase detection methods described herein. In one embodiment, the transmissions are on the same channel, so the receiver is located within a simulcast overlap region, however, the signals are discriminated using the directional antennas at the receiver 1010. The directional nature of the antennas provides adequate signal separation so that the signals from the different transmitters may be discriminated, even when the simulcast condition is present.

In one embodiment, the receiver includes two or more radios which may be tuned to same or different channels. Each antenna is pointed at a particular transmitter and the alignment procedure is performed using the phase detection and delay compensation system described above. This system works with the simulcast condition, since the decibel separation between transmitters provides the adequate signal separation to perform the delay measurements without the distortion present generally to isotropic receivers.

Performance of this system is improved as the directionality of the channels, and the decibel separation of each transmitter is increased. Alternate embodiments may incorporate different numbers of receivers and directional antennas without departing from the scope and spirit of the present invention.

Link Delay Calculation System Using Zero Crossing Detection

Figure 11A:
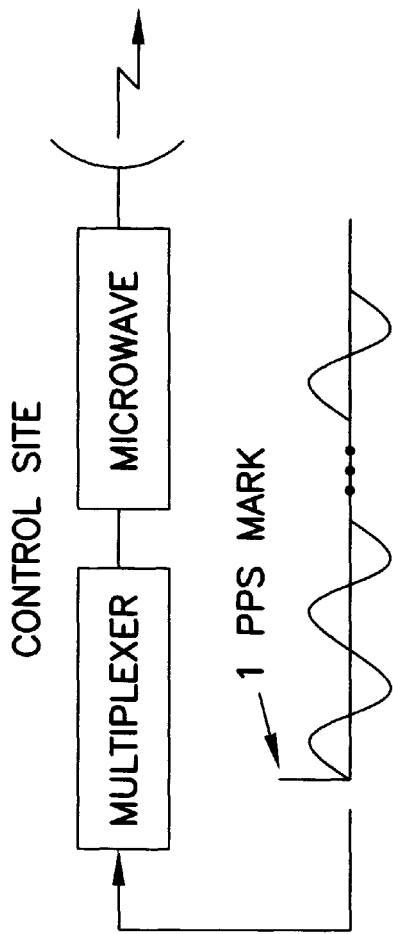
FIG. 11A is a block diagram of the pulsed tone signal as transmitted by the control site.
Figure 11B:
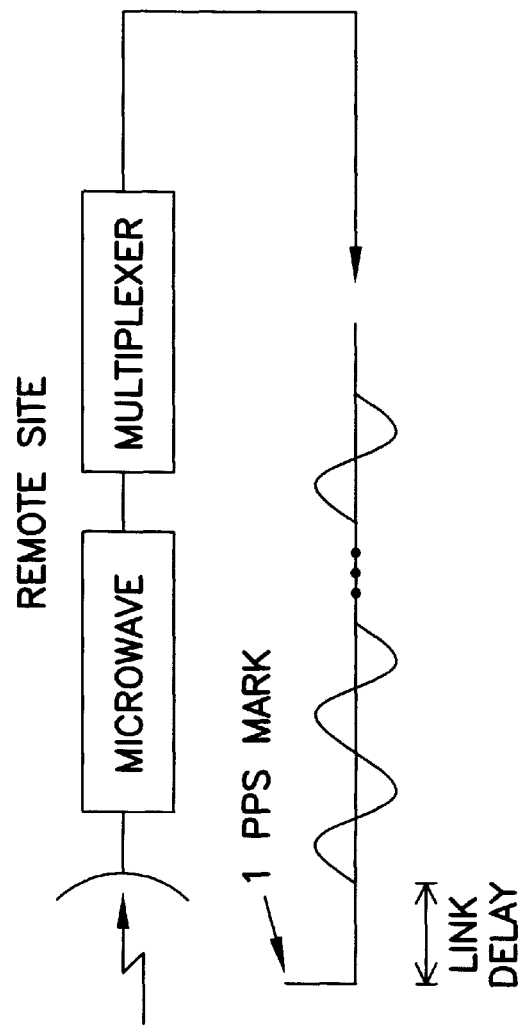
FIG. 11B is a block diagram of the pulsed tone signal as received by the remote site.

In one embodiment, link delays are measured using signals from the global positioning satellite (GPS) system. The first step involves the control site transmitting several cycles of a tone on a 1 pulse-per-second (pps) signal generated by the local GPS unit. This process is illustrated in FIGS. 11A and 11B. At the remote site samples are collected following detection of the 1 pps signal from the remote site's GPS unit. These samples are analyzed in order to estimate the times when the received signal crosses zero. The simplest method for performing this operation is to determine when sign changes occur between adjacent samples. One then interpolates, using the two samples whose signs are different, in order to estimate when the actual signal crossed zero. By having the test signal contain several cycles one is able to average many zero crossings, which improves the accuracy of this technique when noise is present. The theoretical limitations of this method are best understood by considering different values of the link SIN, which is the approach taken in the following discussion.

CASE 1: $S/N \to \infty$

Figure 12:
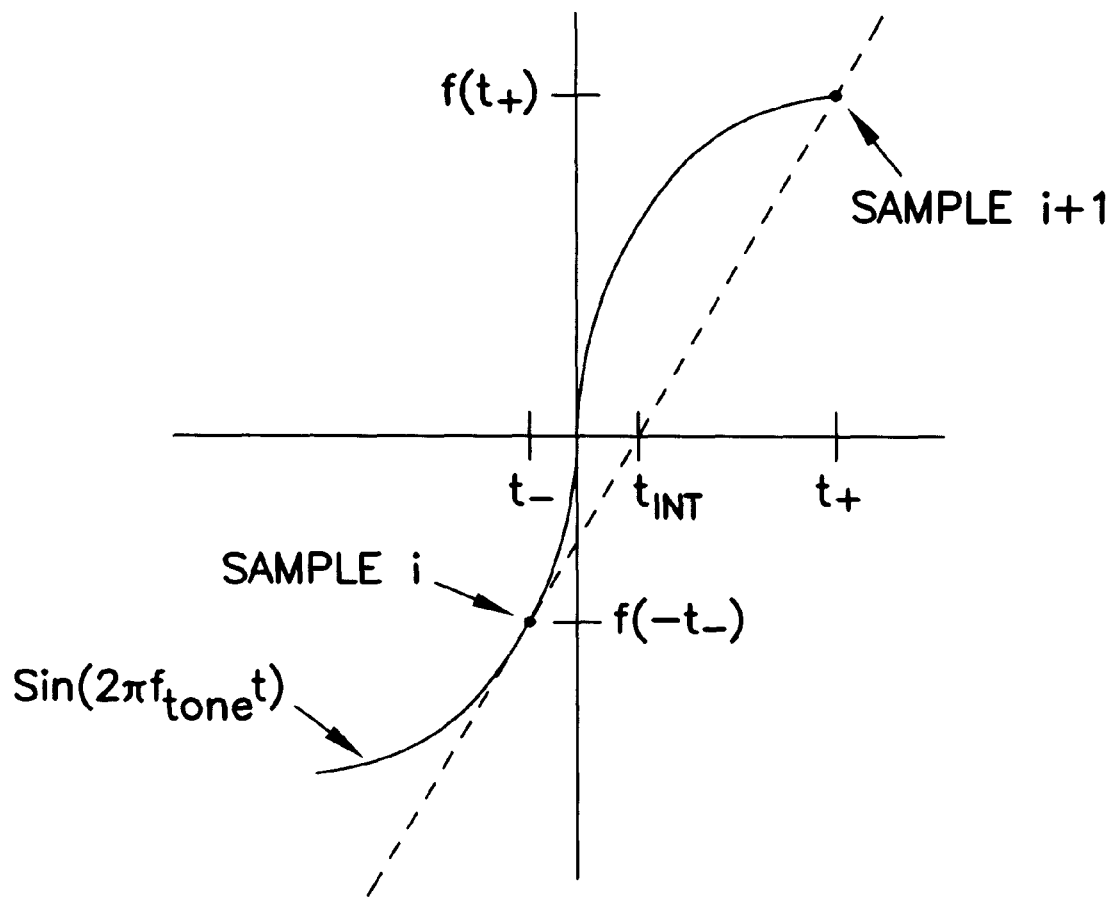
FIG. 12 shows prediction of the zero crossing between adjacent sample pairs.

In the limit of no link noise one can determine the error involved in using zero crossings to estimate link delay. As illustrated in FIG. 12, there is an intrinsic error associated with interpolating to estimate the position of a zero crossing. The equation describing the interpolation function is:

$$y(t) - f(-t_-) = \frac{f(t_+) - f(-t_-)}{t_+ + t_-}(t + t_-) \qquad \text{Eqn. 5}$$

which is shown as the dotted line in FIG. 12. We know that $$f_{sample} = (t_+ + t_-)^{-1}, f(t_+) = \sin(2\pi f_{tone} t_+), f(-t_-) = -\sin(2\pi f_{tone} t_-), \text{ and}$$

$y(t_{int}) = 0$, which allows us to rewrite Eqn. 5 as:

$$t_{int} = \qquad \text{Eqn. 6}$$

-continued $$\frac{\sin\left(2\pi f_{tone}\left[\frac{1}{f_{sample}} - t_+\right]\right)}{f_{sample}\left(\sin[2\pi f_{tone} t_+] + \sin\left[2\pi f_{tone}\left[\frac{1}{f_{sample}} - t_+\right]\right]\right)} - \frac{1}{f_{sample}} + t_+$$

Figure 13:
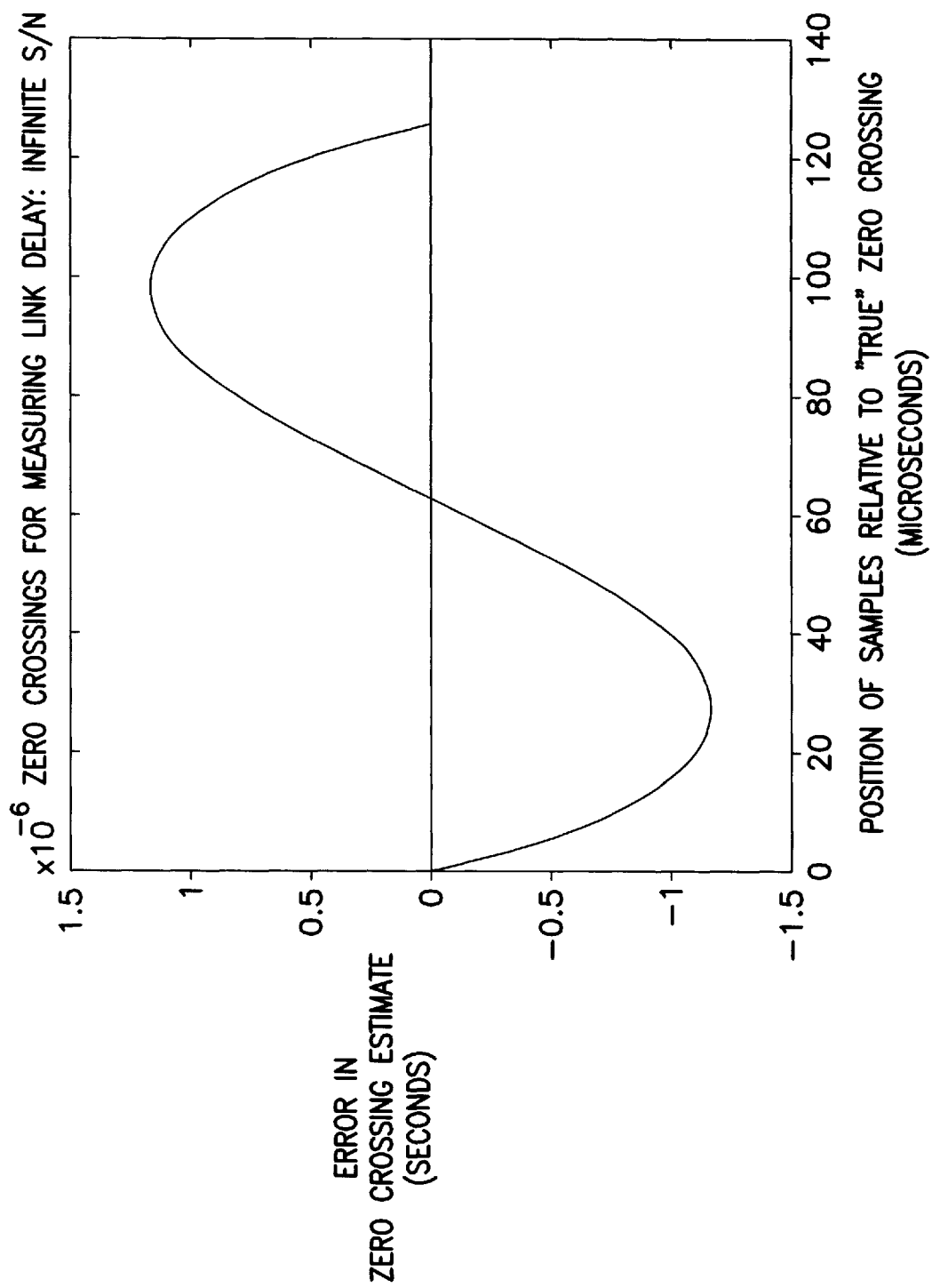
FIG. 13 shows error in predicted or estimated zero crossings with respect to the position of samples relative to "true" zero crossing.

As shown in FIG. 12, the true zero crossing occurs at t=0, implying that Eqn. 6 describes the error in our estimate of the position of the zero crossing. A MATLAB program, presented in Appendix A, was used to plot $t_{int}$ for various tone frequencies, sample rates, and positions of the sampling points relative to the true zero crossing. FIG. 13 shows the error as the sampling position is varied for $f_{tone}$=1kHz and $f_{sample}$=8kHz. One finds that $0 \leq |t_{int}| \leq 1.27$ μsec, where $t_{int}$=0 for $t_+$=0, 62.5, 125 μsec and $|t_{int}| \approx 1.3$ μsec for $t_+ \approx 26$, 99 μsec Therefore, given these conditions the fundamental limit of accuracy of this technique is approximately 1.3 μsec. If a greater accuracy is required one must increase $f_{sample}/f_{tone}$. For example, for $f_{tone}$=1 kHz and $f_{sample}$=16 kHz the upper limit on the magnitude of the error is ≈0.2 μsec.

CASE 2: $1 << S/N < \infty$

Figure 14:
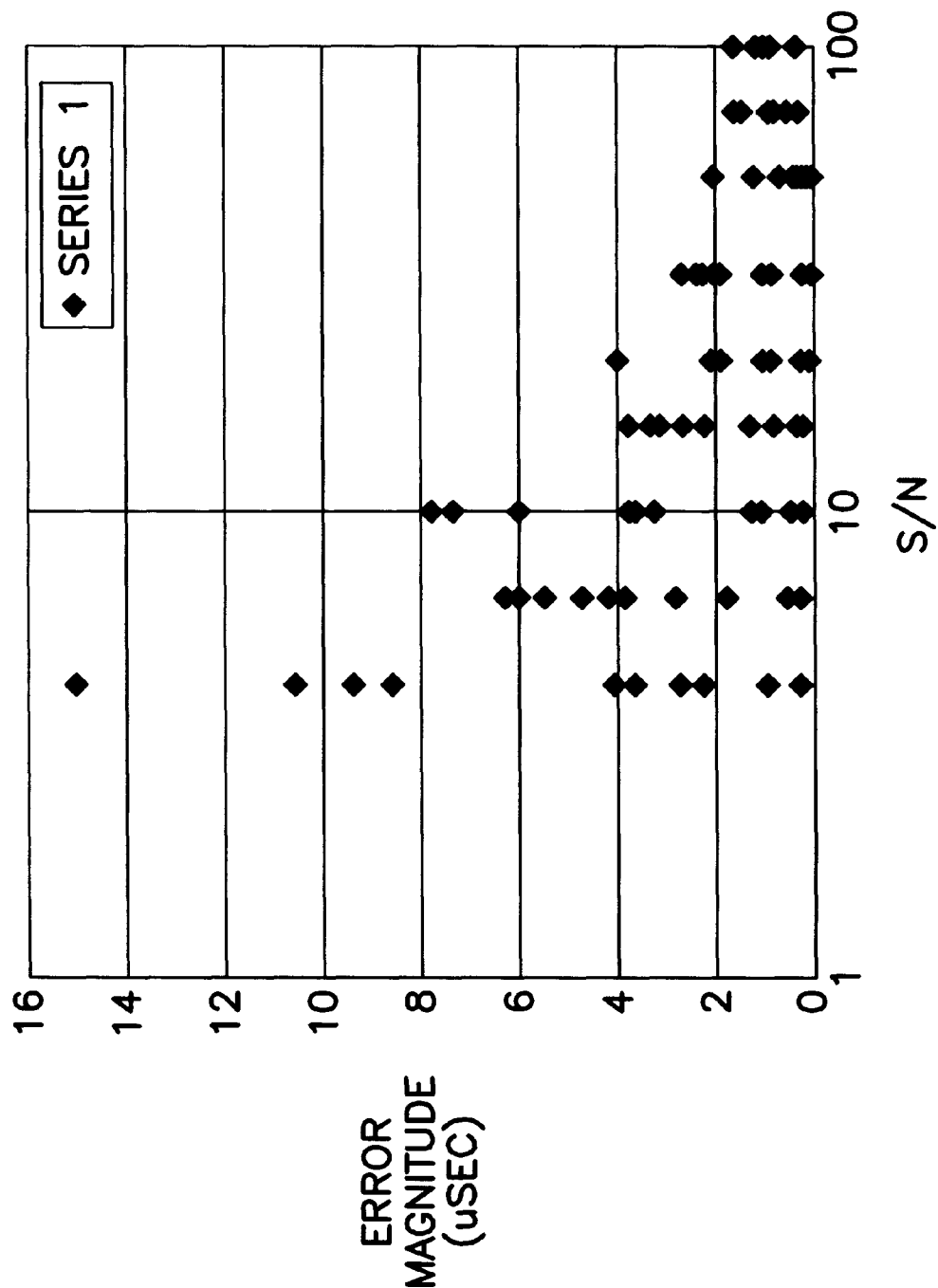
FIG. 14 shows error magnitude as a function of signal to noise ratio.
Figure 15:
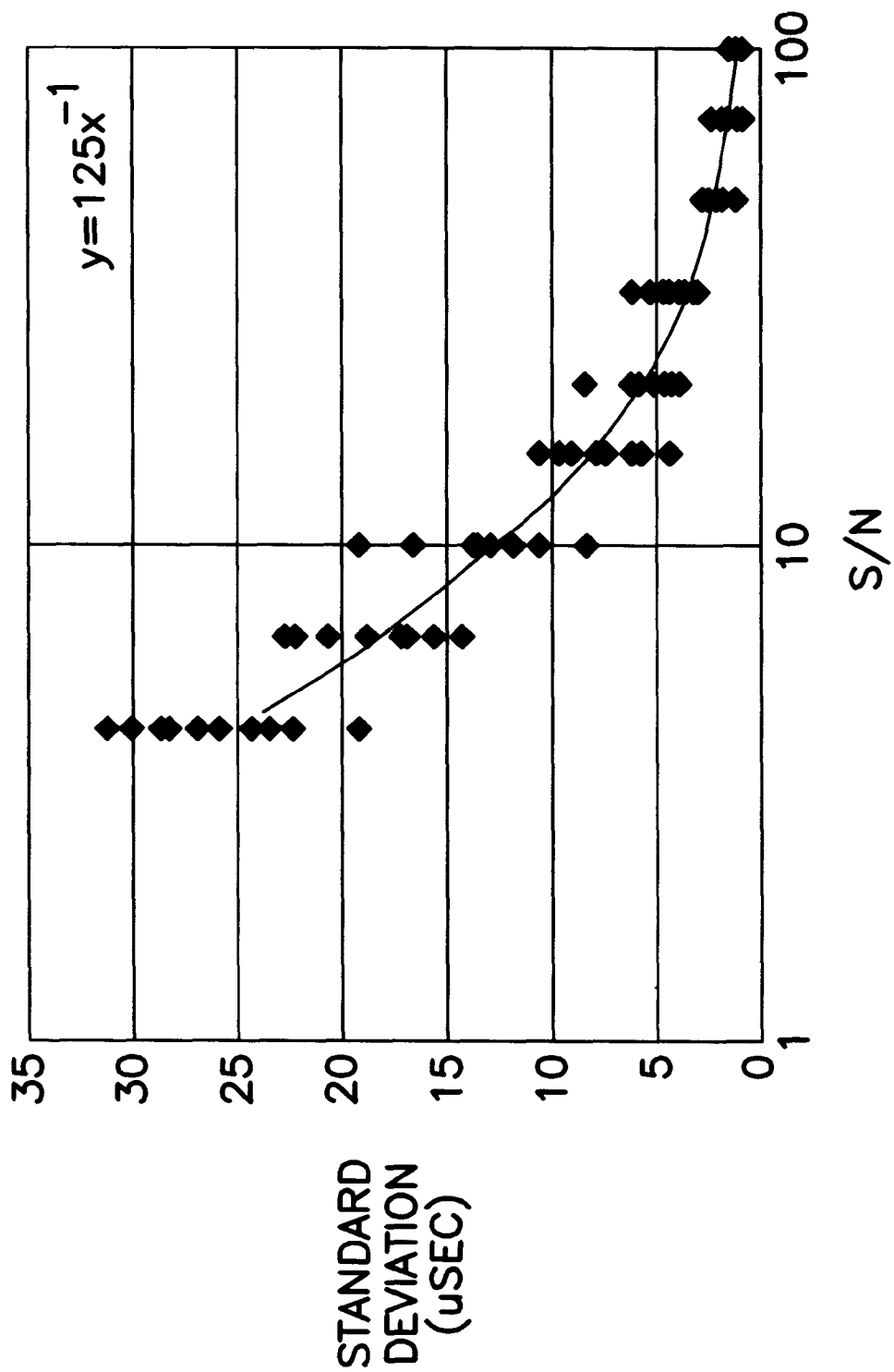
FIG. 15 shows standard deviation as a function of signal to noise ratio.

To investigate the performance of the zero crossings technique as noise is introduced into the link, MATLAB simulations were employed. The MATLAB program used is presented in Appendix B. For this case eight cycles (16 zero crossings) of a 1 KHz tone were sampled at 8 KHz with various levels of random channel noise. A plot of the error resulting from this technique is presented in FIG. 14, which indicates that the magnitude of the error is expected to be ≦5 μsec if the channel S/N is ≧20:1. This program was also used to determine the standard deviation of the 16 zero crossings used to make one link delay measurement, and the results are found in FIG. 15. One finds that the standard deviation can be used to develop a reasonable estimate of the link S/N, which is what determines if the link delay measurement can be considered to be reliable. The computationally nonintensive approach of measuring zero crossings is used to develop an estimate of the link delay which is accurate to the degree required for simulcast.

In one embodiment, a calibration module processes a buffer of data to calculate the link delay between a link transmitter and a link receiver. Delay information is digitally sampled in the time domain according to the One Pulse Per Second (PPS) signal of the Global Positioning System. Alternate embodiments use any other common timing reference signal.

Figure 16:
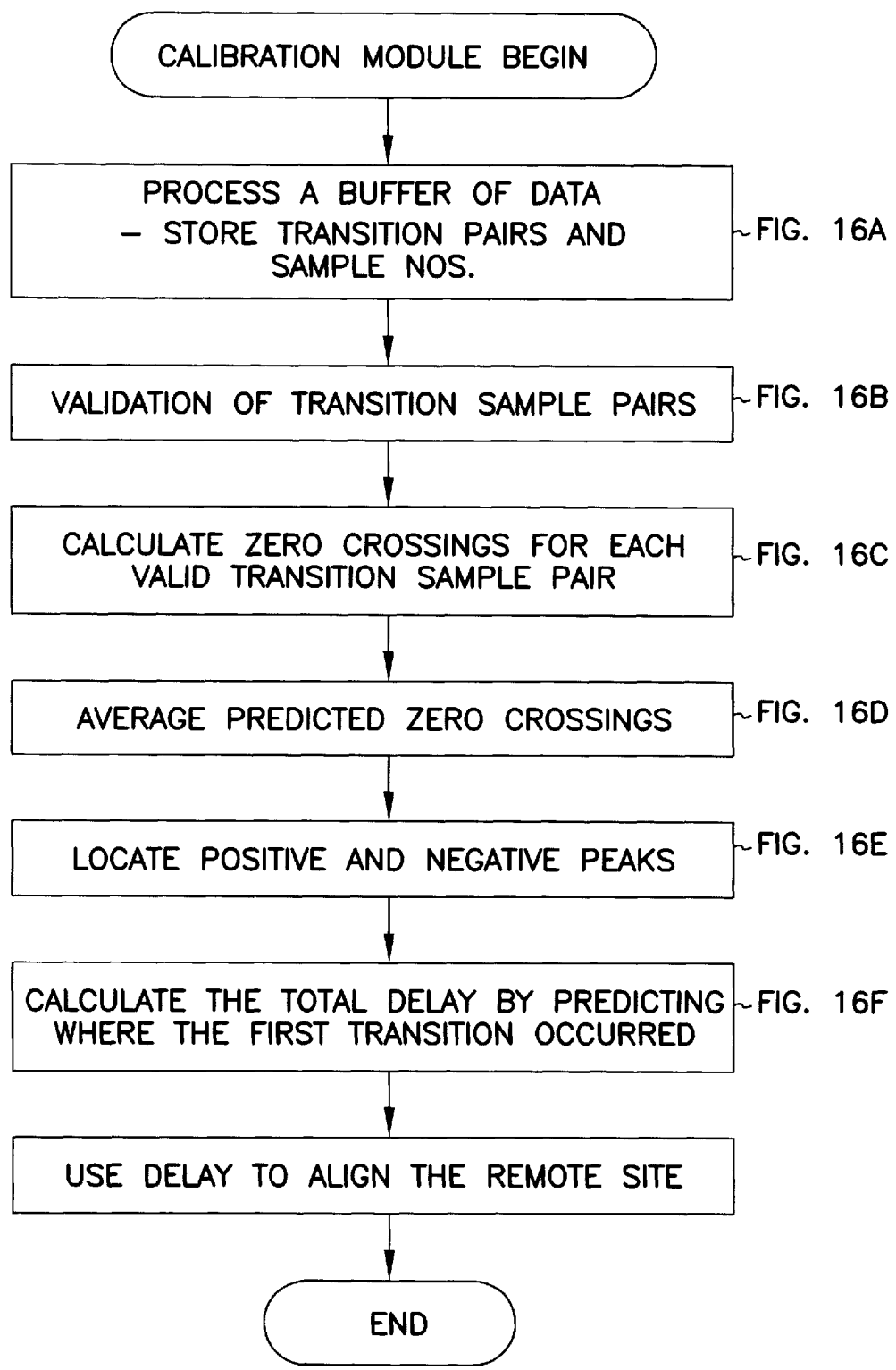
FIG. 16 shows the calibration module and the interrelationship of FIGS. 16A, 16B, 16C, 16D, 16E, and 16F according to one embodiment of the present invention.

One embodiment of the calibration module is shown generally in FIG. 16, and each step is broken down in the flow diagrams of FIGS. 16A–F, as described below.

Figure 16A:
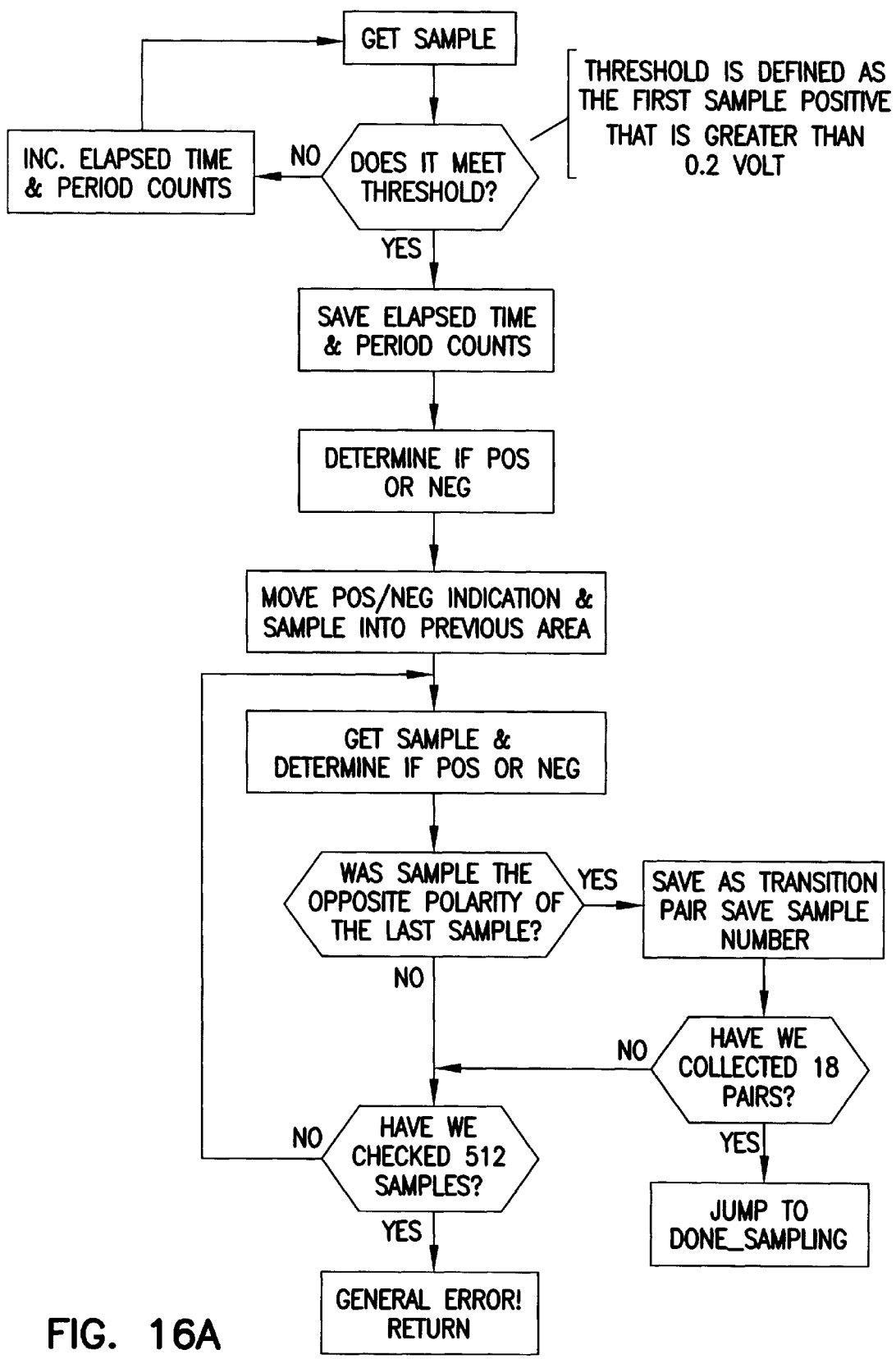
FIG. 16A shows how the calibration module stores sample pairs according to one embodiment of the present invention.

In one embodiment, the calibration module begins processing information when the buffer fills with data; for example, 512 samples representing a 1 KHz tone sampled at 8000 samples/second. As shown in FIG. 16A, the calibration module skips over a leading delay and locates a predetermined threshold value which indicates the place where the tone starts. The sample number where the data exceeds the threshold value is stored is indicative of the number of clock periods of the link delay. The threshold value is approximately 0.2 volts in one system, however, other buffer sizes and threshold values may be used without departing from the scope and spirit of the present invention.

In FIG. 16A, the calibration module finds transition sample pairs which are indicative of a zero crossing event.

The transition sample pairs are where the tone signal transitions from a positive value to a negative value and where the tone signal transitions from a negative value to a positive value. The calibration module stores the sample numbers where transitions are located and the value of each of the transition sample pairs. This process continues until a fixed number of transition sample pairs are found or all of the samples are processed. For example, in one embodiment 18 transition sample pairs are located or all the 512 samples are processed, whichever comes first.

Figure 16B:
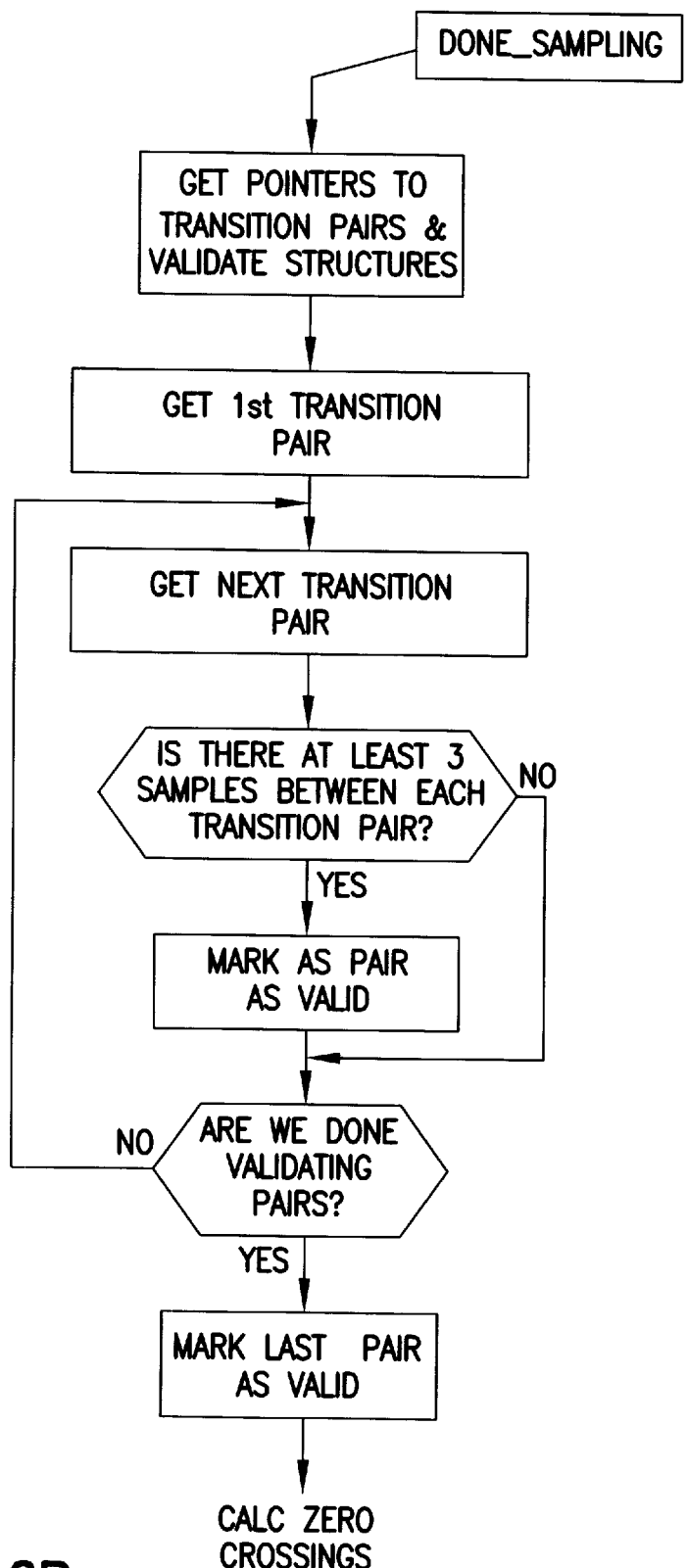
FIG. 16B shows how the calibration module validates sample pairs according to one embodiment of the present invention.

In FIG. 16B, the calibration module validates the transition sample pairs by counting the number of samples between each transition sample pair. The pairs which are determined to be in the proper spacing are deemed "valid" transition sample pairs and the remaining transition sample pairs are labeled "invalid." The valid transition sample pairs are flagged as such and the invalid samples are flagged as invalid. For example, in one embodiment a logic one bit is associated with the valid pairs and a logic zero value is associated with the invalid pairs.

Figure 16C:
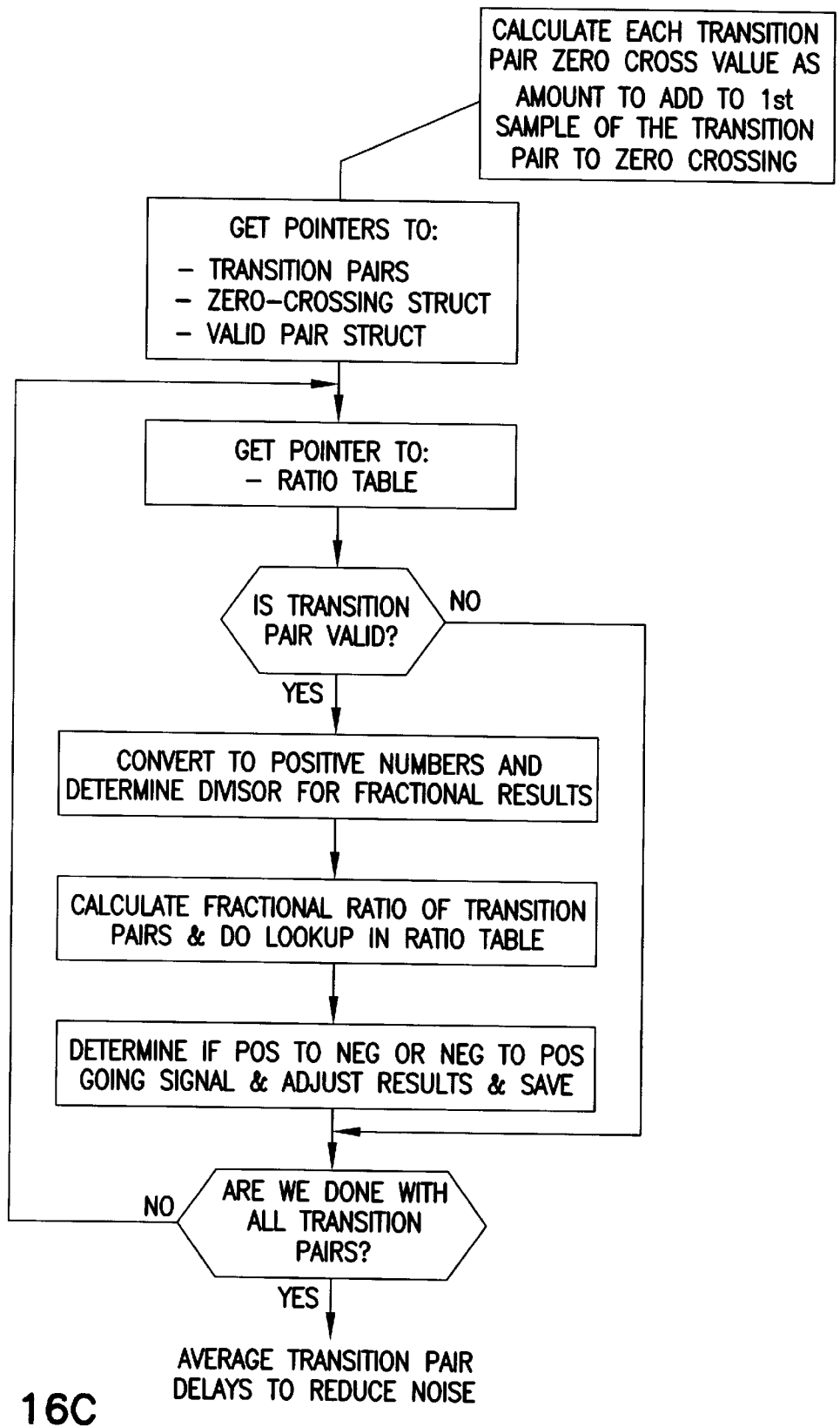
FIG. 16C shows how the calibration module calculates zero crossings for valid transition sample pairs according to one embodiment of the present invention.

In FIG. 16C, the calibration module calculates and stores the predicted crossing point for each valid transition sample pair. A delay for each zero crossing is found by comparing the magnitude of each sample in the pair to obtain a fractional result. The result is compared to a series of entries in a delay table to indicate where the zero crossing is estimated to occur and its associated delay value. The delay value is added when the second sample exceeds the first sample, and it is subtracted when the first sample exceeds the second sample of the valid transition sample pairs.

In one embodiment, given the sampling frequency and the tone frequency, the delay table is precalculated and stored as a lookup table to reduce the amount of time needed to calculate the latency associated with each possible first sample:second sample ratio. In one embodiment the samples are always associated with a fractional value and the delay is added or subtracted as demonstrated above.

Figure 16D:
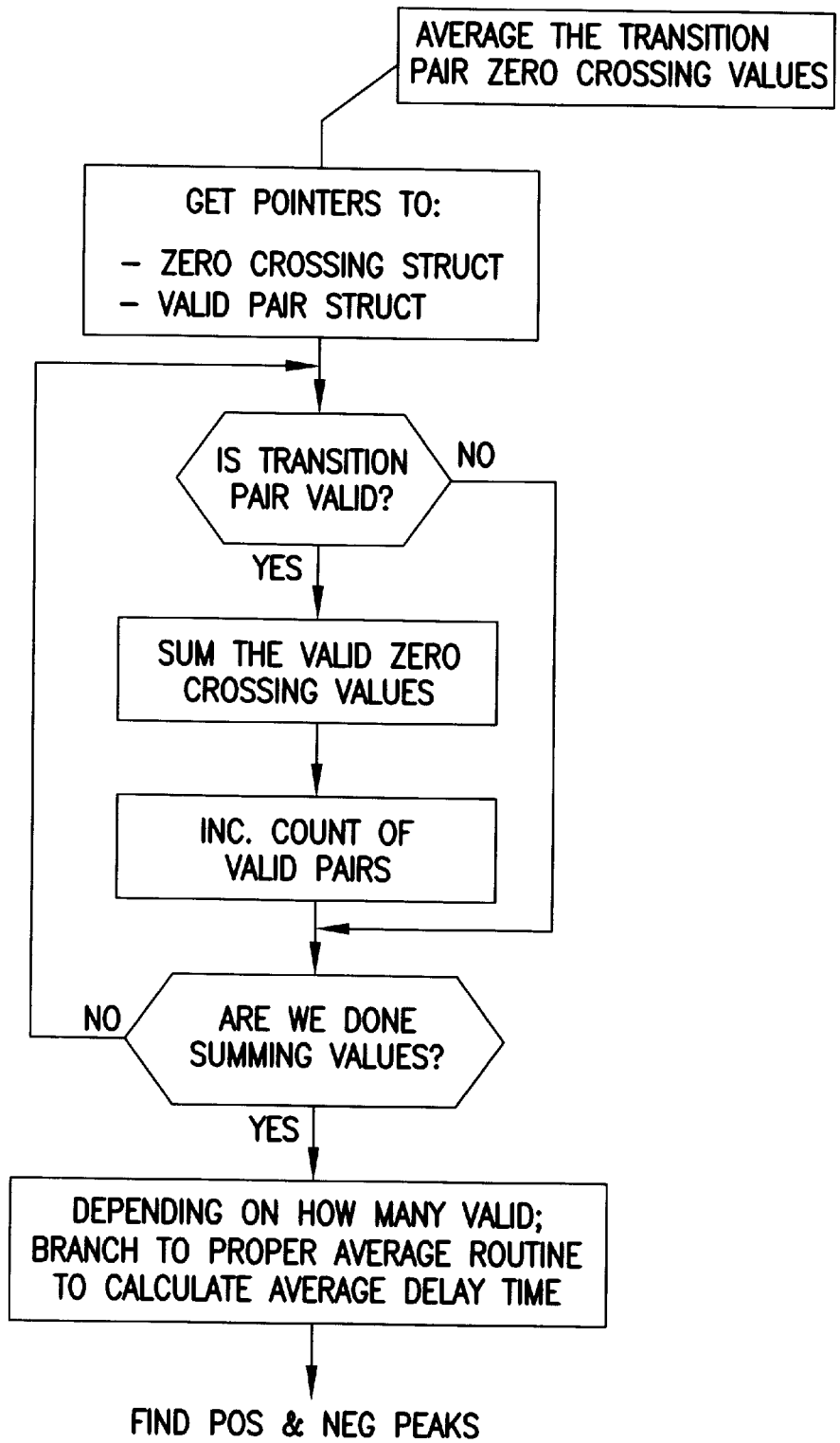
FIG. 16D shows how the calibration module averages predicted zero crossings according to one embodiment of the present invention.

In FIG. 16D, the calibration module averages the predicted zero crossing points and stores the average value. This averaging reduces the effects of random amplitude noise.

Figure 16E:
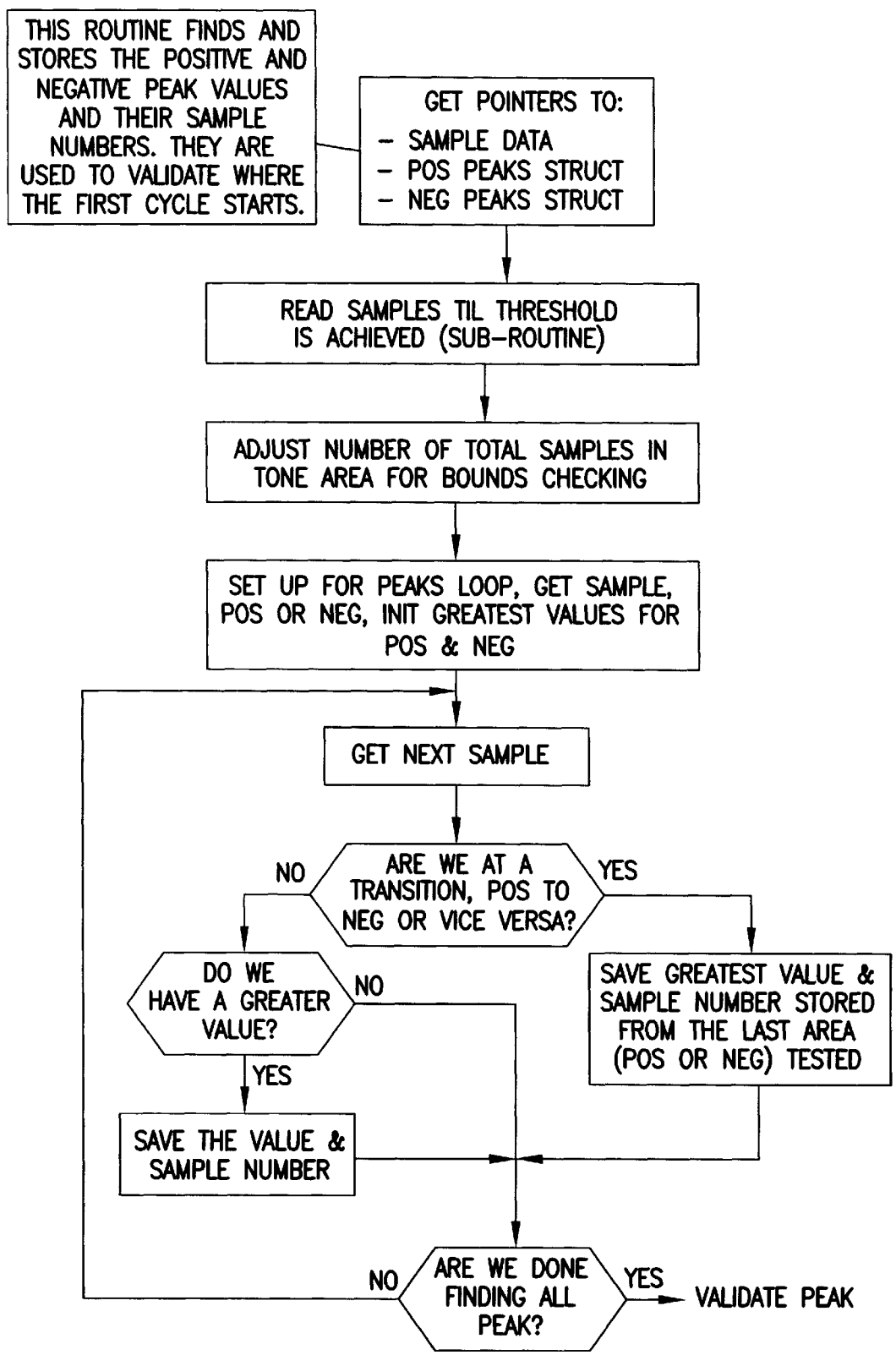
FIG. 16E shows how the calibration module locates positive and negative peaks according to one embodiment of the present invention.

In FIG. 16E, the calibration module locates and stores the peak positive and peak negative values and their associated sample numbers in a buffer. The peak positive and peak negative values are then validated by measuring the samples between the peaks and the valid peaks are marked.

Figure 16F:
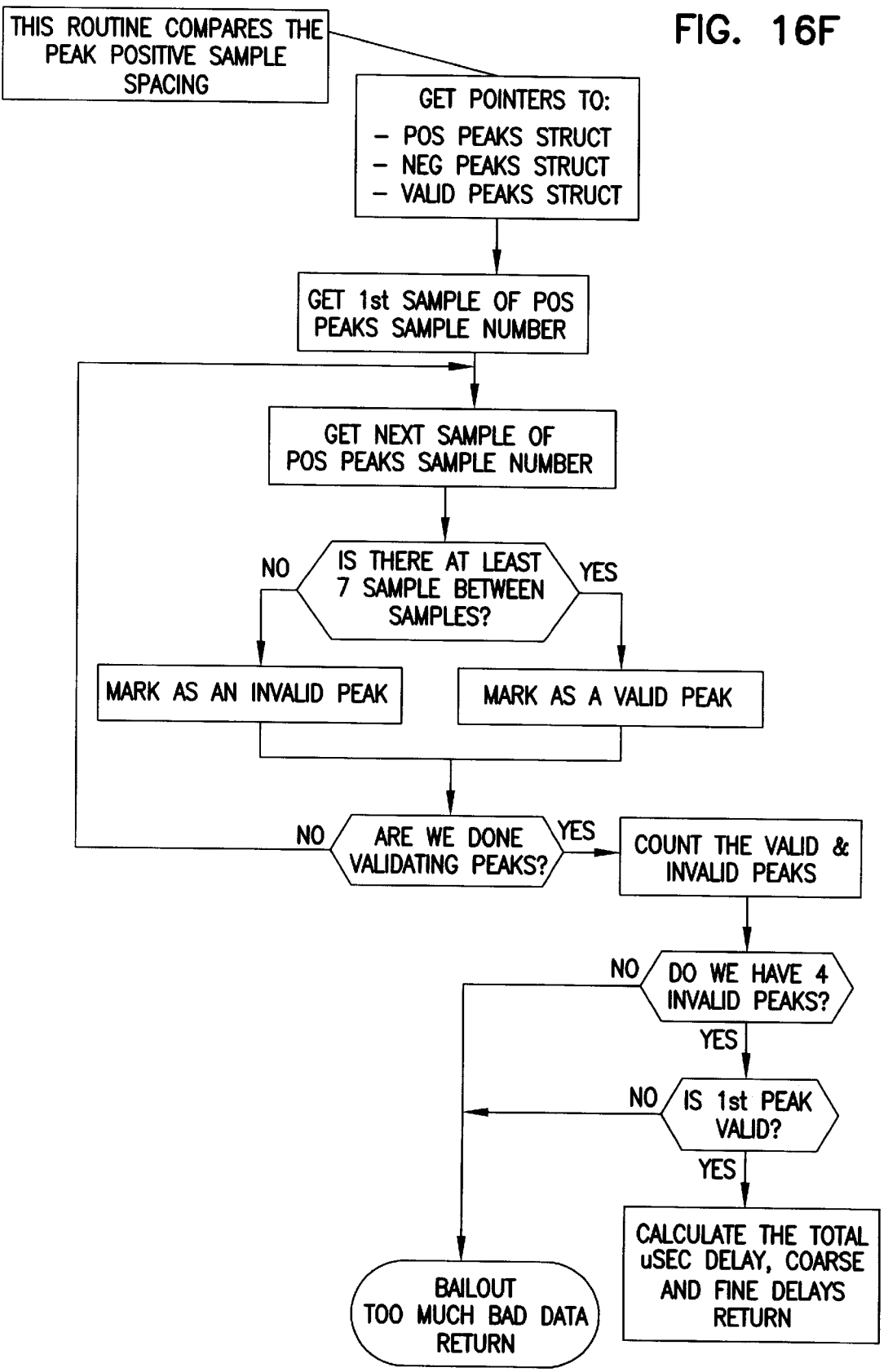
FIG. 16F shows how the calibration module calculates total delay according to one embodiment of the present invention.

In FIG. 16F, the first valid peak is then used to predict the first positive to negative zero crossing using the averaged zero cross value. The first zero crossing is located by subtracting ½ the tone period from the first positive to negative zero crossing which was just previously predicted using the averaged zero cross value. The first zero crossing obtained in this last step is indicative of the overall link delay, D.

In alternate embodiments a coarse delay is used in combination with a fine delay to produce the overall link delay, D. The link transmission is delayed to compensate for the overall link delay, D. In one embodiment, the compensation is performed at the remote site. In another embodiment, the compensation is performed at the central site. Multiple remote sites may be calibrated by equalizing overall link delays in the system.

Link Delay Calculation using Discrete-Time Fourier Transform

In one embodiment, link delays are measured using synchronization signals from the global positioning satellite (GPS) system. The first step involves the control site transmitting several cycles of a tone (a tone burst) on a 1 pulse-per-second (PPS) mark signal generated by the local GPS unit. This process is illustrated in FIGS. 11A and 11B. At the remote site, samples are collected following detection of the 1 PPS signal from the remote site's GPS unit. The sampling clock used for acquisition at the remote site is frequency locked to the sampling clock used for generation at the control site. This frequency locking is accomplished via the 10 MHz GPS synchronization signal. The remote site samples are stored in a buffer and analyzed in order to estimate the starting time of the received tone burst.

One method for calculate the time delay is to use the Discrete-Time Fourier Transform (DTFT) to find the starting phase of a segment of the tone burst. A segment is simply a particular subset of the samples that make up the tone burst. If the cycle in which the segment starts is known, the starting phase can be used to estimate link delay which is accurate to the degree required for the simulcast. This approach is independent of the amplitude of the tone burst and is exact in the absence of noise. In addition, it can be done in a computationally efficient manner on a DSP chip.

Figure 17:
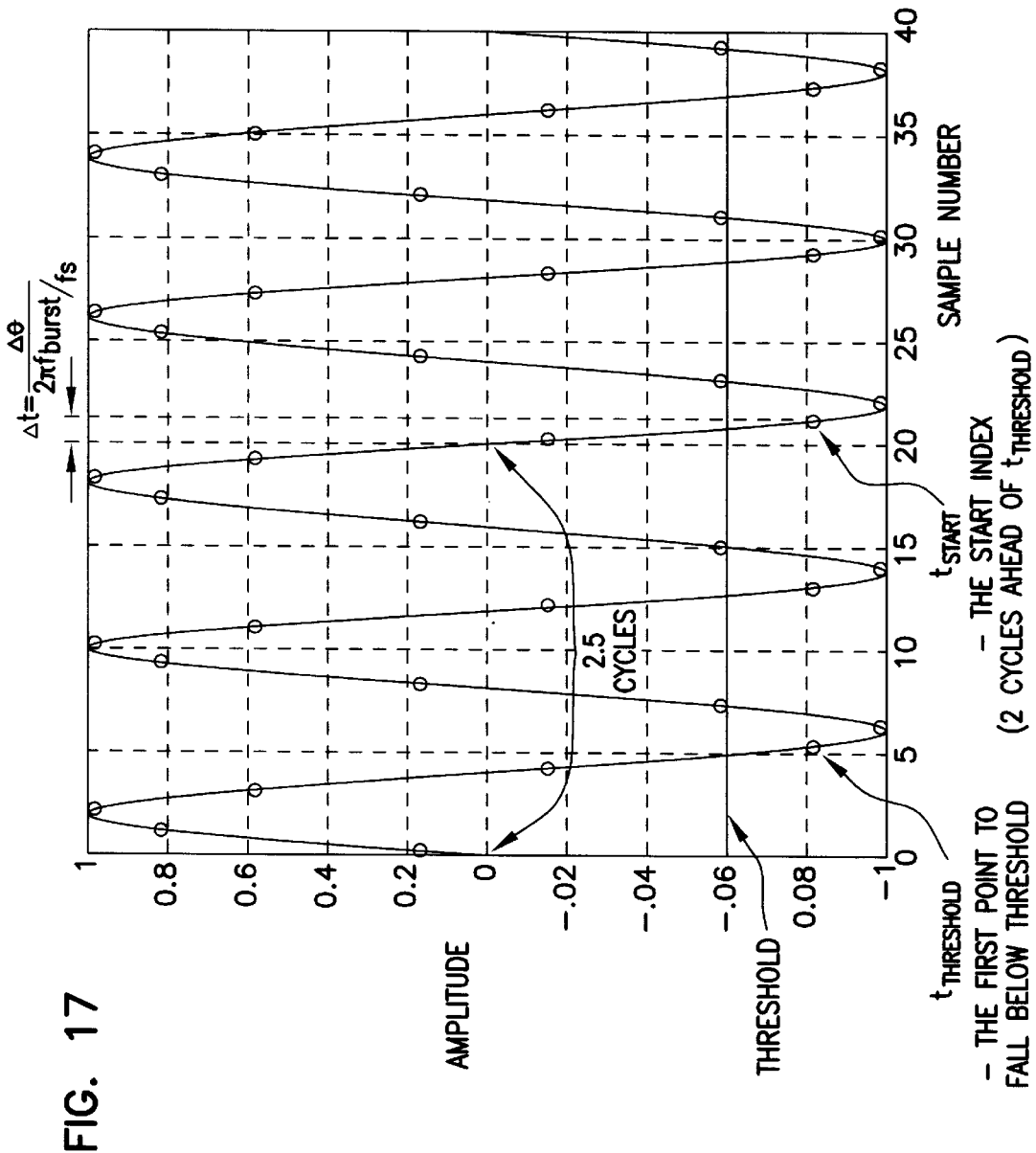
FIG. 17 is an illustration of measurement of link delay using threshold triggering and a discrete-time Fourier transform.

FIG. 17 shows a 5 cycle tone burst with a normalized frequency of 0.125. (The leading and trailing delays are not shown in this figure.) The threshold shown is a negative value. The first point in the data buffer to fall below this threshold is indicated by $t_{thresh}$. This identifies the first cycle in the tone burst. Because of transients caused by the tone burst, it is preferable to start the segment after the first few cycles. $t_{start}$ 2 cycles ahead of $t_{thresh}$ and represents a suitable starting point for the segment. From the $t_{start}$ point onward, the segment must include an integer number of cycles. For this reason, it is crucial to select the tone burst frequency such that its period is an integer number of samples (e.g., a 1 kHz burst with an 8 kHz sampling frequency results in a period of 8 samples.)

Let x(t) be the signal stored in the data buffer. The DTFT of the segment starting at $t_{start}$ for M cycles is given by $$X(\tilde{\omega}_0) = \sum_{t=t_{start}}^{t_{start}+MN-1} x(t)e^{-j\tilde{\omega}_0(t-t_{start})}$$

where N is the period of the tone and $\omega_0=2\pi(f_{burst}/f_{sampling})$. Note that the phase term in this DTFT has been offset by $e^{j\tilde{\omega}_0 t_{start}}$. This forces the phase derived from the DTFT to be relative to a zero-phase complex sinusoid. In this context, zero-phase simply means that in the summation above the real component begins at 1 and the imaginary component begins at 0. Equivalently, the start time is shifted to zero.

The start phase of the segment is given by $$\theta_{start}=\tan^{-1}[imag(X(\omega_0))/real(X(\omega_0))]$$

which is relative to a cosine waveform starting at time zero. Due to the fact that the $t_{start}$ point is in quadrant II (or possibly quadrant III) of the unit circle, the previous zero crossing of the cosine waveform occurs at 90 degrees. Therefore the difference in phase between the zero crossing and the $t_{start}$ point is given by $\Delta\theta=\theta_{start}-90$. The time in samples from the zero crossing to $t_{start}$ is given by $$\Delta t=\Delta\theta/2\pi(f_{burst}/f_{sampling}).$$

From $t_{start}$ to the beginning of the burst, one must subtract $\Delta t$ to get to the previous zero crossing and then subtract 2.5 cycles to get to the beginning of the burst. The link delay in samples is therefore $t_{start}-\Delta t-2.5$ N. (See FIG. 17) Note that the link delay estimate is a floating point value. In general, the link delay will not be an integer multiple of the sampling interval. Appendix C shows MATLAB code which simulates the link delay calculation.

The threshold may be adjusted for noisy environments, to decrease the possibility of noise triggering the discrete-time Fourier transform operation.

Other techniques to compensate for noise include, but are not limited to, statistical analysis of a number of calculated time delays. In one embodiment, an average delay and a standard deviation are calculated and samples greater than the standard deviation are discarded. One embodiment will remove noisy samples by selecting a maximum change in delay, say 5 μsec, for example, and then discarding samples which deviate more than 5 μsec from an average delay. Other embodiments for treating noisy samples are possible without departing from the scope and spirit of the present invention.

What is claimed is:

1. A method for measuring delay, comprising the steps of:

receiving a signal at a remote site;

processing the signal using Fourier transforms to determine a time delay using an external timing reference;

transmitting a gated signal from a central site, the gated signal having a first periodic component which is substantially less than a link time delay between repeaters of the repeater system and a second periodic component which is substantially greater than the link time delay, wherein the first periodic component and the second periodic component are aligned in phase to a reference timing signal;

receiving the gated signal at a remote site;

analog to digital converting the gated signal to create a sequence of digitized samples, wherein the analog to digital converting is performed in phase with the reference timing signal;

locating transition pairs in the sequence of digitized samples;

predicting zero crossings associated with each of the transition pairs;

averaging the zero crossings and using the averaged value to predict a starting point of the gated signal; and introducing a delay to compensate for a link delay calculated from the starting point of the gated signal.

2. The method of claim 1, where the signal is a tone, the remote site is a remote repeater site, the external timing reference is a global positioning satellite system, and the time delay is a link delay between a central repeater site and the remote repeater site.

3. The method of claim 2, further comprising the step of:

introducing the delay at the central repeater site to compensate for the link delay.

4. The method of claim 3, wherein compensation is performed at the central repeater site.

5. The method of claim 3, wherein compensation is performed at the remote site.

6. The method of claim 1, wherein the step of processing comprises the steps of:

analog to digital converting the signal to create a sequence of digitized samples, wherein the analog to digital converting is performed in phase with the external timing reference;

detecting a crossing of a threshold amplitude of the gated signal by inspecting amplitudes of the digitized samples;

performing a discrete-time Fourier transform N periods of the first periodic component after the crossing to get phase information from the digitized samples;

generating a partial time delay from the phase information; and adding N periods to the partial time delay to calculate the time delay.

7. The method of claim 1, wherein the external timing reference is a global positioning satellite system.

8. A method for alignment of a repeater system, comprising the steps of:

transmitting a gated signal from a central site, the gated signal having a first periodic component which is substantially less than a link time delay between repeaters of the repeater system and a second periodic component which is substantially greater than the link time delay, wherein the first periodic component and the second periodic component are aligned in phase to a reference timing signal;

receiving the gated signal at a remote site;

analog to digital converting the gated signal to create a sequence of digitized samples, wherein the analog to digital converting is performed in phase with the reference timing signal;

detecting a crossing of a threshold amplitude of the gated signal by inspecting amplitudes of the digitized samples;

performing a discrete-time Fourier transform N periods of the first periodic component after the crossing to get phase information from the digitized samples;

generating time delay from the phase information;

adding N periods to the time delay to calculate the link delay; introducing a delay to compensate for the link delay;

measuring a plurality of time delays; and deleting time delays which exceed a predefined maximum time delay.

9. The method of claim 8, wherein N=2.

10. The method of claim 8, wherein the reference timing signal is a signal from a global positioning satellite system.

11. The method of claim 8, wherein the compensation is performed at the central site.

12. The method of claim 8, wherein the compensation is performed at the remote site.

13. A method for alignment of a repeater system, comprising the steps of:

transmitting a gated signal from a central site, the gated signal having a first periodic component which is substantially less than a link time delay between repeaters of the repeater system and a second periodic component which is substantially greater than the link time delay, wherein the first periodic component and the second periodic component are aligned in phase to a reference timing signal;

receiving the gated signal at a remote site;

analog to digital converting the gated signal to create a sequence of digitized samples, wherein the analog to digital converting is performed in phase with the reference timing signal;

detecting a crossing of a threshold amplitude of the gated signal by inspecting amplitudes of the digitized samples;

performing a discrete-time Fourier transform N periods of the first periodic component after the crossing to get phase information from the digitized samples;

generating time delay from the phase information;
adding N periods to the time delay to calculate the link delay;
introducing a delay to compensate for the link delay;
measuring a plurality of time delays;

calculating a standard deviation of the plurality of time delays; and deleting time delays which exceed the standard deviation.

* * * * *